(12) United States Patent
Inomata et al.

(10) Patent No.: US 11,183,942 B2
(45) Date of Patent: Nov. 23, 2021

(54) POWER CONVERSION APPARATUS, POWER CONVERSION SYSTEM, AND METHOD FOR CONVERTING POWER

(71) Applicant: KABUSHIKI KAISHA YASKAWA DENKI, Kitakyushu (JP)

(72) Inventors: Kentaro Inomata, Kitakyushu (JP); Akira Yamazaki, Kitakyushu (JP); Masato Higuchi, Kitakyushu (JP); Hidenori Hara, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

(21) Appl. No.: 16/671,222

(22) Filed: Nov. 1, 2019

(65) Prior Publication Data
US 2020/0144930 A1   May 7, 2020

(30) Foreign Application Priority Data

Nov. 1, 2018   (JP) .............................. JP2018-206714

(51) Int. Cl.
| | | |
|---|---|---|
| *H02M 5/45* | (2006.01) | |
| *H02M 5/458* | (2006.01) | |
| *H02M 1/38* | (2007.01) | |
| *H02M 1/08* | (2006.01) | |
| *H02M 1/00* | (2006.01) | |

(52) U.S. Cl.
CPC .......... *H02M 5/4585* (2013.01); *H02M 1/38* (2013.01); *H02M 1/0009* (2021.05); *H02M 1/08* (2013.01); *H02M 1/385* (2021.05)

(58) Field of Classification Search
CPC .... H02M 5/4585; H02M 1/38; H02M 1/1385; H02M 1/0009; H02M 1/08
See application file for complete search history.

(56) References Cited

U.S. PATENT DOCUMENTS

| | | | | |
|---|---|---|---|---|
| 2004/0080293 | A1* | 4/2004 | Kurosawa | ................ H02P 6/20 318/400.11 |
| 2012/0074888 | A1* | 3/2012 | Maekawa | ................ H02P 6/18 318/400.36 |

(Continued)

FOREIGN PATENT DOCUMENTS

| | | |
|---|---|---|
| JP | 2015-037350 A | 2/2015 |
| JP | 2019-068559 A | 4/2019 |

OTHER PUBLICATIONS

Office Action dated Jul. 21, 2020 in corresponding Japanese Patent Application No. 2018-206714 (with English-language Translation), 7 pages.

*Primary Examiner* — Rafael O De Leon Domenech
(74) *Attorney, Agent, or Firm* — Oblon, McClelland, Maier & Neustadt, L.L.P.

(57) ABSTRACT

A power conversion apparatus connectable in parallel to a second power conversion apparatus includes circuitry that generates a carrier wave, generates a pulse signal synchronized with the carrier wave, generates power that is based on a width of the pulse signal, obtains a monitor value corresponding to a circulating current circulating between the power conversion apparatus and the second power conversion apparatus, and based on the monitor value obtained while the power conversion circuitry is generating driving power, changes a period of the carrier wave to decrease the circulating current.

18 Claims, 16 Drawing Sheets

(56) References Cited

U.S. PATENT DOCUMENTS

| | | | |
|---|---|---|---|
| 2015/0145462 A1* | 5/2015 | Ulrich | H02M 3/1584 |
| | | | 318/503 |
| 2017/0133921 A1* | 5/2017 | Okumura | H02M 1/12 |
| 2017/0179836 A1* | 6/2017 | Kondo | H02M 1/4258 |
| 2017/0279371 A1* | 9/2017 | Yamashita | H02M 7/48 |

* cited by examiner

POWER CONVERSION APPARATUS, POWER CONVERSION SYSTEM, AND METHOD FOR CONVERTING POWER

CROSS-REFERENCE TO RELATED APPLICATIONS

The present application claims priority under 35 U.S.C. § 119 to Japanese Patent Application No. 2018-206714, filed Nov. 1, 2018. The contents of this application are incorporated herein by reference in their entirety.

BACKGROUND

Field of the Invention

The embodiments disclosed herein relate to a power conversion apparatus, a power conversion system, and a method for converting power.

Discussion of the Background

JP2015-037350A discloses an inverter system in which a plurality of inverters are connected in parallel to each other. Each of the inverters includes a communicator, a carrier phase generator, a carrier signal generator, and a PWM signal generator. The carrier phase generator generates a carrier phase. The carrier signal generator generates a carrier signal based on the carrier phase. The PWM signal generator generates a PWM signal based on the carrier signal. The communicator transmits a carrier phase to another inverter, and the carrier phase generator generates a carrier phase based on another carrier phase received by the communicator from the other inverter.

SUMMARY

According to one aspect of the present invention, a power conversion apparatus connectable in parallel to a second power conversion apparatus includes circuitry that generates a carrier wave, generates a pulse signal synchronized with the carrier wave, generates power that is based on a width of the pulse signal, obtains a monitor value corresponding to a circulating current circulating between the power conversion apparatus and the second power conversion apparatus, and based on the monitor value obtained while the power conversion circuitry is generating driving power, changes a period of the carrier wave to decrease the circulating current.

According to another aspect of the present invention, a power conversion system includes a first power conversion apparatus, and a second power conversion apparatus. The first and second power conversion apparatuses are connectable in parallel to each other, and at least one of the first power conversion apparatus and the second power conversion apparatus includes circuitry that generates a carrier wave, generates a pulse signal synchronized with the carrier wave, generates power that is based on a width of the pulse signal, obtains a monitor value corresponding to a circulating current circulating between the first power conversion apparatus and the second power conversion apparatus, and based on the monitor value obtained while the circuit is generating driving power, changes a period of the carrier wave to decrease the circulating current.

According to yet another aspect of the present invention, a method for converting power in a power conversion apparatus connectable in parallel to a second power conversion apparatus includes generating a carrier wave, generating a pulse signal synchronized with the carrier wave, causing a power converter to generate power that is based on a width of the pulse signal, obtaining a monitor value corresponding to a circulating current circulating between the power conversion apparatus and the second power conversion apparatus, and based on the monitor value obtained while the power converter is generating driving power, changing a period of the carrier wave to decrease the circulating current.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
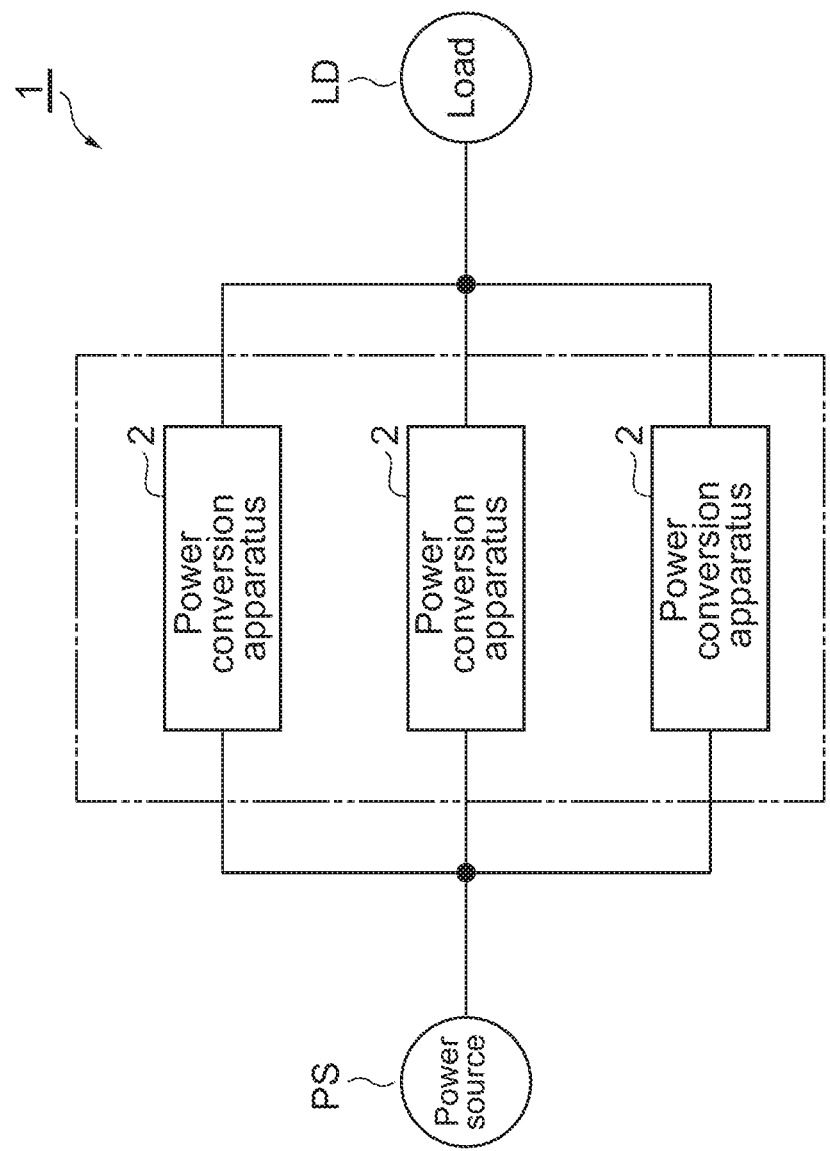
FIG. 1 schematically illustrates a power conversion system according to a first embodiment.

The embodiments will now be described with reference to the accompanying drawings, wherein like reference numerals designate corresponding or identical elements throughout the various drawings.

1. First Embodiment

1.1 Power Conversion System

A power conversion system 1 illustrated in FIG. 1 is a system that performs power conversion between power source PS and load LD. A non-limiting example of the power source PS is a power system, and a non-limiting example of the load LD is a motor. As used herein, the term "power conversion" refers to a conversion of power form. Also as used herein, the term "power form" encompasses the number of lines, direct-current (DC), alternating-current (AC), voltage (voltage amplitude), current (current amplitude), and frequency.

The power conversion system 1 includes at least two power conversion apparatuses 2. The at least two power conversion apparatuses 2 are connected in parallel to each other via wires between the power source PS and the load LD. In other words, each of the power conversion apparatuses 2 is connected to the power source PS and the load LD, and is connected in parallel to the other power conversion apparatus(es) 2. Each power conversion apparatus 2 performs power conversion between the power source PS and the load LD. For example, the power conversion apparatus 2 performs power conversion between three-phase current power on the power source PS side and three-phase current power on the load LD side. There is no particular limitation to the total number of power conversion apparatuses 2 that can be provided in the power conversion system 1. FIG. 1 illustrates an example in which the power conversion system 1 includes three power conversion apparatuses 2. While in FIG. 1 the plurality of power conversion apparatuses 2 are connected in parallel to each other via wires each having an inductance component and a resistance component, it is also possible to provide a reactor (inductor) having an inductance component and a resistance component between each power conversion apparatus 2 and the power source PS, and/or provide a reactor (inductor) having an inductance component and a resistance component between each power conversion apparatus 2 and the load LD. In other words, the plurality of power conversion apparatuses 2 may be connected in parallel to each other via reactors on at least one of the power source PS side and the load LD side.

1.2 Power Conversion Apparatus

Figure 2:
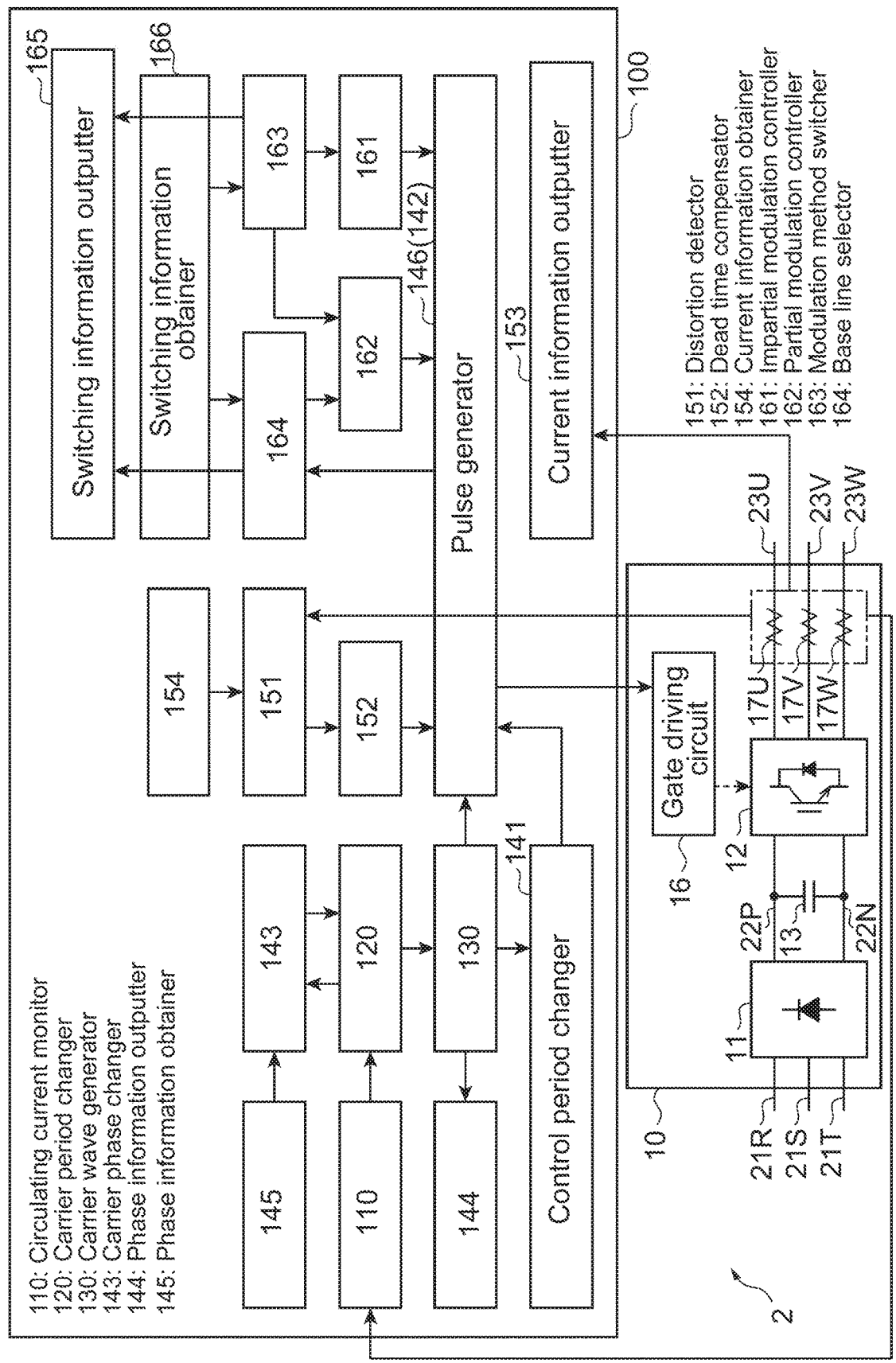
FIG. 2 is a block diagram illustrating a configuration of the power conversion apparatus.

As illustrated in FIG. 2, the power conversion apparatus 2 includes a power conversion circuit 10 and a control circuit 100. The power conversion circuit 10 includes a rectifier circuit 11, an inverter circuit 12, a capacitor 13, a gate driving circuit 16, and the current sensors 17U, 17V, and 17W.

The power conversion circuit 10 (power converter, which is a non-limiting example of the circuit recited in the appended claims) includes the rectifier circuit 11, the inverter circuit 12, the capacitor 13, and the gate driving circuit 16. A non-limiting example of the rectifier circuit 11 is a diode bridge circuit. The rectifier circuit 11 rectifies three-phase current power on lines 21R, 21S, and 21T, which are connected to the power source PS. Then, the rectifier circuit 11 outputs the rectified power to lines 22P and 22N (DC bus line). The capacitor 13 is disposed between and connected to the lines 22P and 22N, and smoothens DC voltage between the lines 22P and 22N.

The inverter circuit 12 performs power conversion between DC power on the lines 22P and 22N and three-phase current power on lines 23U, 23V, and 23W, which are connected to the load LD, so that the voltages on the lines 23U, 23V, and 23W follow a voltage command value and the currents on the lines 23U, 23V, and 23W follow a current command value. The inverter circuit 12 performs the power conversion by changing the connection state of how the lines 22P and 22N are connected to the lines 23U, 23V, and 23W. As used herein, the phrase "changing the connection state" refers to changing the way the lines 23U, 23V, and 23W are connected to the lines 22P and 22N. The connection state encompasses a state in which neither of the lines 23U, 23V, and 23W is connected to any of the lines 22P and 22N.

For example, the inverter circuit 12 includes a plurality of switching elements and switches the switching elements on and off individually, thereby changing the connection end of each of the lines 23U, 23V and 23W between the lines 22P and 22N. Examples of each switching element include, but are not limited to, a power metal-oxide-semiconductor field-effect transistor (MOSFET) and an insulated gate bipolar transistor (IGBT). With this configuration, each switching element performs on-off switching in response to a gate driving signal.

The gate driving circuit 16 generates, in response to a pulse signal from the control circuit 100, a gate driving signal for on-off switching purposes, and outputs the gate driving signal to the switching elements of the inverter circuit 12. The current sensor 17U detects the current on the line 23U. The current sensor 17V detects the current on the line 23V The current sensor 17W detects the current on the line 23W.

It is to be noted that the power converter of the power conversion apparatus 2 will not be limited to an inverter circuit. The power converter of the power conversion apparatus 2 may be implemented by any other element insofar as the element is capable of performing power conversion by pulse modulation. Other possible examples of the power converter include an H bridge circuit, a two-level inverter circuit, a multi-level inverter circuit, a modular multi-level conversion circuit, a matrix converter circuit, a PWM converter circuit, and a 120-degree conduction converter circuit. A matrix converter circuit does not include the rectifier circuit 11 and the capacitor 13. A PWM converter circuit and a 120-degree conduction converter circuit do not include the rectifier circuit 11. AC lines (corresponding to the lines 23U, 23V and 23W) of the PWM converter circuit and the 120-degree conduction converter circuit are connected to the power source PS, and DC lines (corresponding to the lines 22P and 22N) of the PWM converter circuit and the 120-degree conduction converter circuit are connected to the load LD.

The control circuit 100 performs: generating a carrier wave; generating a pulse signal synchronized with the carrier wave; causing the inverter circuit 12 to generate power that is based on the width of the pulse signal; obtaining a monitor value corresponding to a circulating current circulating between the power conversion apparatus 2 and another power conversion apparatus 2; and based on a monitor value obtained while the inverter circuit 12 is generating driving power, changing carrier period to decrease the circulating current. It is to be noted that the obtaining of a monitor value and the changing of the carrier period based on the monitor value may be performed in all the control circuits 100 of the power conversion apparatuses 2 or may be omitted in any one of the control circuits 100 of the power conversion apparatuses 2.

The control circuit 100 may further perform: based on one current index value corresponding to the current output from the inverter circuit 12 and the current output from the inverter circuit 12 of another power conversion apparatus 2, detecting a current distortion and/or a voltage distortion caused by the dead time of the inverter circuit 12; and correcting the width of the pulse signal based on the detected current distortion and/or the detected voltage distortion.

As exemplified in FIG. 2, the control circuit 100 includes functional configurations (hereinafter referred to as "functional modules"), namely, a carrier wave generator 130, a pulse generator 142, a circulating current monitor 110, and a carrier period changer 120.

The carrier wave generator 130 generates a carrier wave. For example, the carrier wave generator 130 generates a triangular wave as the carrier wave. The pulse generator 142 generates a pulse signal synchronized with the carrier wave, and outputs the pulse signal to the gate driving circuit 16. Specifically, the pulse generator 142 generates a pulse signal synchronously with the carrier wave to cause the inverter circuit 12 to change the connection state of how the lines 22P and 22N, which are on the primary side, are connected to the lines 23U, 23V, and 23W, which are on the secondary side.

The pulse generator 142 includes a driving pulse generator 146. The driving pulse generator 146 generates a pulse signal for outputting driving power. As used herein, the term "driving power" refers to power to operate the load LD. Also as used herein, the phrase "operate the load LD" refers to changing a state of the load LD mechanically or electrically. For example, when the load LD is a rotational motor, the phrase "operate the load LD" is equivalent to rotating the rotation axis of the motor. The driving pulse generator 146 compares the carrier wave with a voltage command value for driving the load LD, and generates a pulse signal indicating that the period of time for which the voltage command value is in excess of the carrier wave is H level and the period of time for which the carrier wave is in excess of the voltage command value is L level. This ensures that a pulse signal synchronized with the timing at which the carrier wave and the voltage command value match is generated, the width of the pulse signal being variable depending on a change in the voltage command value.

The circulating current monitor 110 obtains a monitor value corresponding to a circulating current circulating between the power conversion apparatus 2 and another power conversion apparatus 2. As used herein, the term "circulating current" refers to current flowing to another power conversion apparatus 2 instead of to the load LD. The monitor value may be any value insofar as the value is variable depending on a change in the circulating current. As used herein, the phrase "obtain a monitor value" encompasses calculating a monitor value based on a value that has been obtained. For example, the circulating current monitor 110 obtains, as the monitor value, a difference between: a first current generated by the inverter circuit 12 at a first timing set in one period of the carrier wave; and a second current generated by the inverter circuit 12 at a second timing set in the one period. In this respect, the first timing and the second timing may be phase-shifted from each other by half the period of the carrier wave, and the circulating current monitor 110 may obtain, as the monitor value, a difference between the first current and the second current, which are respectively generated at the first timing and the second timing by the inverter circuit 12.

The inverter circuit 12 generates a top current at a top timing corresponding to a top portion of the carrier wave; and a bottom current at a bottom timing corresponding to a bottom portion of the carrier wave. The circulating current monitor 110 may regard the difference between the top current and the bottom current as the difference between the first current and the second current, and may obtain the difference between the top current and the bottom current as the monitor value. As used herein, the phrase "top timing corresponding to a top portion of the carrier wave" refers to the timing at which the value of a triangular wave is at its maximum (that is, the timing corresponding to the apex of the triangular wave). Also as used herein, the phrase "bottom timing corresponding to a bottom portion of the carrier wave" refers to the timing at which the value of a triangular wave is at its minimum (that is, the timing corresponding to the lowermost part of the bottom of the triangular wave).

Based on the monitor value obtained by the circulating current monitor 110 while the inverter circuit 12 is generating driving power, the carrier period changer 120 changes the period of the carrier wave to decrease the circulating current. The carrier period changer 120 may change the period of the carrier wave generated by the carrier wave generator 130 without changing the waveform of the carrier period.

It is to be noted that changing the period of one top of the carrier wave involves a shift of the phase of the next top. Specifically, shortening the period of one top moves the phase of the next top forward, while elongating the period of one top moves the phase of the next top backward. That is, changing the period of the carrier wave encompasses changing the phase of the carrier wave. If the period of one top is changed while the period of the next top is kept unchanged, the next top is changed in its phase alone. That is, the carrier period changer 120 can also be used to change the phase of the carrier wave.

Figure 3:
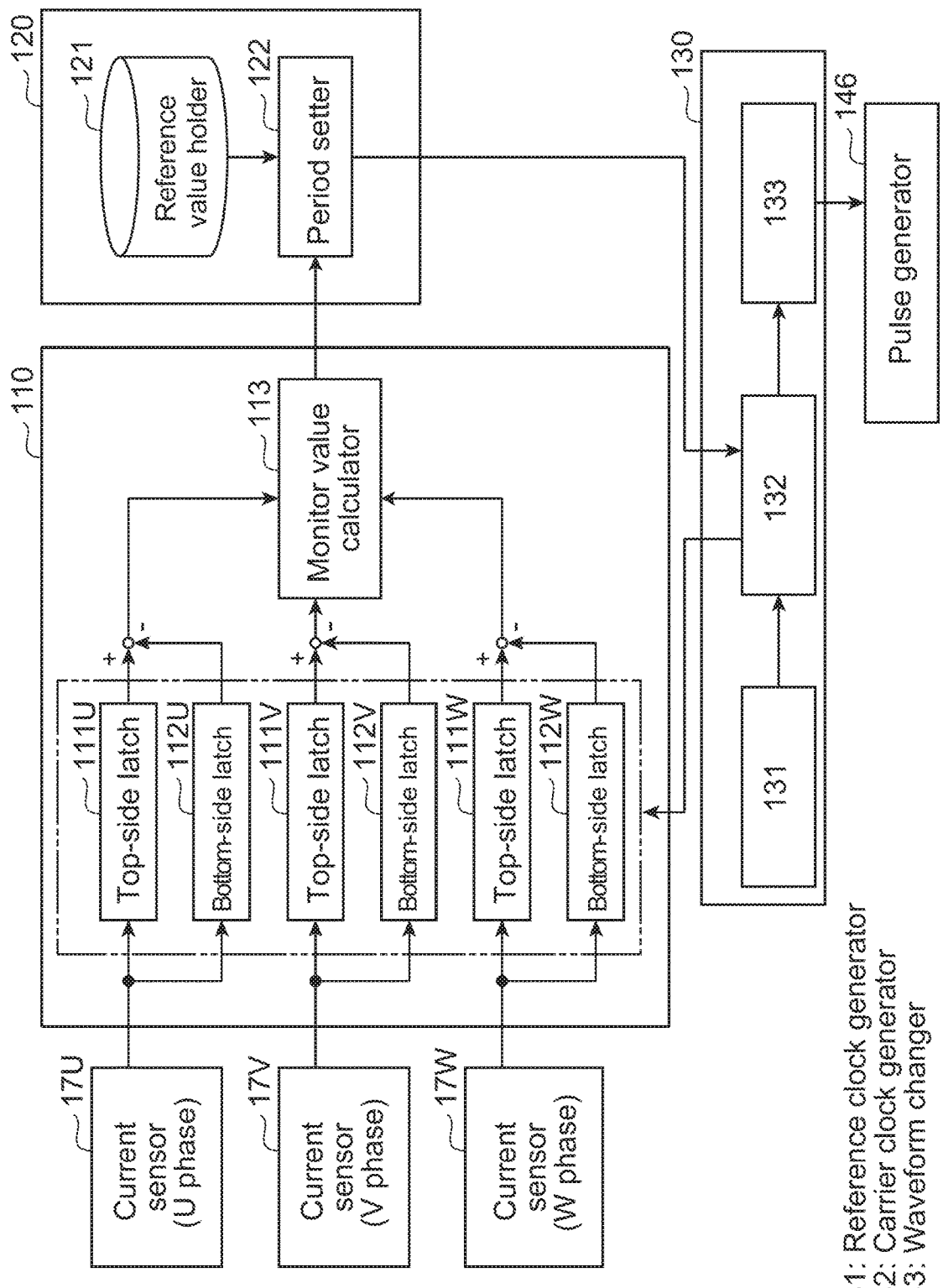
FIG. 3 is a block diagram illustrating more detailed example configurations of a circulating current monitor, a carrier period adjustor, and a carrier wave generator.

FIG. 3 is a block diagram illustrating more detailed example configurations of the carrier wave generator 130, the circulating current monitor 110, and the carrier period changer 120. As illustrated in FIG. 3, the carrier wave generator 130 can be more meticulously segmented into the following functional modules: a reference clock generator 131; a carrier clock generator 132; and a waveform changer 133.

The reference clock generator 131 generates a reference clock pulse, which is for measuring a lapse of time. By counting the number of reference clock pulses, a lapse of time can be quantified.

The carrier clock generator 132 alternates and repeats: counting up the reference clock pulses generated by the reference clock generator 131 until the count reaches a compare-match count value (described later); and counting down the reference clock pulses to zero. While the carrier clock generator 132 is counting up, the carrier clock generator 132 outputs an H-level signal. While the carrier clock generator 132 is counting down, the carrier clock generator 132 outputs an L-level signal. This ensures that a pulse signal having a period equivalent to twice the compare-match count value is output (this pulse signal will be hereinafter referred to as "carrier clock pulse").

The waveform changer 133 changes the waveform of the carrier clock pulse from a rectangular shape to a triangular shape. For example, the waveform changer 133 linearly increases the carrier clock pulse during the period of time when the carrier clock pulse is H level, while the waveform changer 133 linearly decreases the carrier clock pulse during the period of time when the carrier clock pulse is L level. This ensures that a triangular wave having a period equivalent to twice the compare-match count value is generated as the carrier wave. It is to be noted that the counter value obtained by the carrier clock generator 132 may be used as the carrier wave. In this case, the waveform changer 133 may be omitted.

The circulating current monitor 110 can be more meticulously segmented into the following functional modules: top-side latches 111U, 111V, and 111W; bottom-side latches 112U, 112V, and 112W; and a monitor value calculator 113.

The top-side latch 111U obtains and holds the value of a top current detected by the current sensor 17U at a top timing corresponding to the top portion of the carrier wave (this top current will be hereinafter referred to as "top-portion U-phase current value"). The top-side latch 111V obtains and holds the value of a top current detected by the current sensor 17V at the top timing corresponding to the top portion of the carrier wave (this top current will be hereinafter referred to as "top-portion V-phase current value"). The top-side latch 111W obtains and holds the value of a top current detected by the current sensor 17W at the top timing corresponding to the top portion of the carrier wave (this top current will be hereinafter referred to as "top-portion W-phase current value").

The bottom-side latch 112U obtains and holds the value of a bottom current detected by the current sensor 17U at a bottom timing corresponding to the bottom portion of the carrier wave (this bottom current will be hereinafter referred to as "bottom-portion U-phase current value"). The bottom-side latch 112V obtains and holds the value of a bottom current detected by the current sensor 17V at the bottom timing corresponding to the bottom portion of the carrier wave (this bottom current will be hereinafter referred to as "bottom-portion V-phase current value"). The bottom-side latch 112W obtains and holds the value of a bottom current detected by the current sensor 17W at the bottom timing corresponding to the bottom portion of the carrier wave (this bottom current will be hereinafter referred to as "bottom-portion W-phase current value").

The monitor value calculator 113 calculates the above-described monitor value by calculating the sum of the difference between the top-portion U-phase current value and the bottom-portion U-phase current value, the difference between the top-portion V-phase current value and the bottom-portion V-phase current value, and the difference between the top-portion W-phase current value and the bottom-portion W-phase current value. The monitor value calculated in this manner is equivalent to the difference between a zero-phase current value at the top timing corresponding to the top portion of the carrier wave (this value will be hereinafter referred to as "top-portion zero-phase current value") and a zero-phase current value at the bottom timing corresponding to the bottom portion of the carrier wave (this value will be hereinafter referred to as "bottom-portion zero-phase current value").

Figure 4:
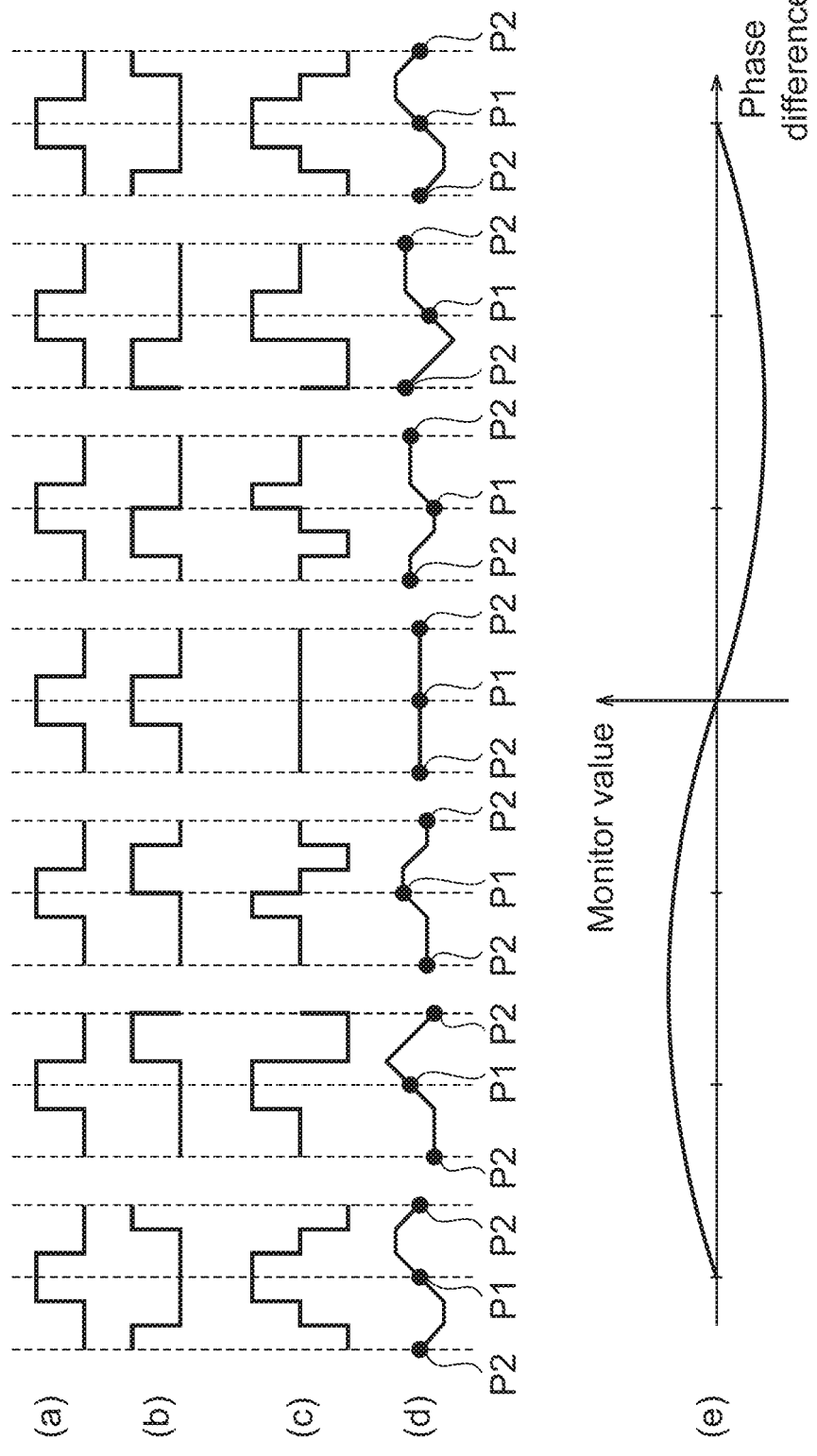
FIG. 4 illustrates an example relationship between pulse command phase difference and monitor value.

Referring to FIG. 4, graphs (a) show pulse signals generated in the power conversion apparatus 2 (hereinafter referred to as "this apparatus"). Graphs (b) show pulse signals generated in another power conversion apparatus 2 (hereinafter referred to as "the other apparatus"). Graphs (c) show differences in pulse signal between this apparatus and the other apparatus. Graphs (d) show zero-phase current values of this apparatus.

In (a) to (d) illustrated in FIG. 4, the center graph shows that the pulse signal generated in this apparatus and the pulse signal generated in the other apparatus are synchronized with each other. The graph located at the first left position from the center graph shows a case where the phase of the pulse signal generated in the other apparatus is delayed by 60° (degrees) behind the phase of the pulse signal generated in this apparatus. The graph located at the second left position from the center graph shows a case where the phase of the pulse signal generated in the other apparatus is delayed by 120° (degrees) behind the phase of the pulse signal generated in this apparatus. The graph located at the third left position from the center graph shows a case where the phase of the pulse signal generated in the other apparatus is delayed by 180° (degrees) behind the phase of the pulse signal generated in this apparatus. The graph located at the first right position from the center graph shows a case where the phase of the pulse signal generated in the other apparatus is faster by 60° (degrees) than the phase of the pulse signal generated in this apparatus. The graph located at the second right position from the center graph shows a case where the phase of the pulse signal generated in the other apparatus is faster by 120° (degrees) than the phase of the pulse signal generated in this apparatus. The graph located at the third right position from the center graph shows a case where the phase of the pulse signal generated in the other apparatus is faster by 180° (degrees) than the phase of the pulse signal generated in this apparatus.

In the graphs (d) illustrated in FIG. 4, P1 denotes the bottom-portion zero-phase current value of this apparatus, and P2 denotes the top-portion zero-phase current value of this apparatus. The graph (e) illustrated in FIG. 4 shows a relationship between the pulse signal phase difference (the difference in phase between the pulse signal generated in the other apparatus and the pulse signal generated in this apparatus) and the monitor value (which is the difference between the top-portion zero-phase current value and the bottom-portion zero-phase current value). As seen from the graph (e), the monitor value is negative when the phase difference is positive, while the monitor value is positive when the phase difference is negative.

When the phase difference is positive, the phase of the pulse signal generated in the other apparatus is faster than the phase of the pulse signal generated in this apparatus. When the phase difference is negative, the phase of the pulse signal generated in the other apparatus is delayed behind the phase of the pulse signal generated in this apparatus. Thus, the phase difference and the monitor value are correlated with each other. Specifically, when the monitor value is positive, delaying the phase of the pulse signal generated in this apparatus decreases the monitor value, while when the monitor value is negative, advancing the phase of the pulse signal generated in this apparatus decreases the monitor value.

As described above, the pulse signal is synchronized with the carrier wave. In other words, when the monitor value is positive, delaying the phase of the carrier wave generated in this apparatus decreases the monitor value, while when the monitor value is negative, advancing the phase of the carrier wave generated in this apparatus decreases the monitor value.

It is to be noted that the graph (e) illustrated in FIG. 4 shows a case where the zero phase current is determined mainly by the inductance component. As clearly seen from this graph, by obtaining, as the monitor value, the difference between the first current and the second current, which are respectively generated at the first timing and the second timing (which are phase-shifted from each other by half the period of the carrier wave) by the inverter circuit 12, a circulating current caused by a phase difference can be detected in the detection range of −180° to +180°, which covers approximately one period of the carrier wave. Also, the first timing and the second timing, which are phase-shifted from each other by half the period of the carrier wave, respectively correspond to the top portion and the bottom portion of the carrier wave. This ensures that the timings at which a circulating current is detected are timings at which no level change of the pulse signal occurs, with the result that the circulating current contains no switching noise. This further increases the monitor value, resulting in enhanced detection sensitivity.

It is to be noted that when the zero phase current is determined mainly by the resistance component, the waveform of the zero phase current is close to the waveform of the pulse signal difference. In this case, it is effective to locate the first timing and the second timing at positions immediately after level changes in the pulse signal. In other situations, the main factor to determine the zero phase current may depend on whether the load LD is in powering state or regeneration state. In this case, it is possible to change the timing between the first timing and the second timing depending on whether the load LD is in powering state or regeneration state. Whether the load LD is in powering state or regeneration state may be determined based on, for example, the potential difference between the lines 22P and 22N.

When the power conversion system 1 includes three or more power conversion apparatuses 2, the monitor value calculated in this apparatus is determined based on the difference between the pulse signal generated in this apparatus and the average value of the pulse signals generated in the plurality of the other apparatuses. Specifically, this apparatus is related to the plurality of the other apparatuses in the same manner as the manner in which this apparatus is related to an imaginary another apparatus defined as follows.

Imaginary another apparatus: the other apparatus in which the pulse signal generated has the average value of the pulse signals generated in the plurality of the other apparatuses.

Thus, when the power conversion system 1 includes three or more power conversion apparatuses 2, the pulse signal phase difference between this apparatus and the pulse signal generated in the imaginary other apparatus is correlated with the monitor value generated in this apparatus as shown in the graph (e) illustrated in FIG. 4. As seen in the graph (e), even when the power conversion system 1 includes three or more power conversion apparatuses 2, it is possible to say that when the monitor value is positive, delaying the phase of the pulse signal generated in this apparatus decreases the monitor value, while when the monitor value is negative, advancing the phase of the pulse signal generated in this apparatus decreases the monitor value.

Referring again to FIG. 3, the carrier period changer 120 can be more meticulously segmented into the following functional modules: a reference value holder 121 and a period setter 122. The reference value holder 121 stores a reference value of the above-described compare-match count value (this reference value will be hereinafter referred to as "reference count value"). The period setter 122 changes the compare-match count value based on the monitor value calculated by the monitor value calculator 113.

As described above, the carrier clock generator 132 outputs a carrier clock pulse having a period equivalent to twice the compare-match count value, and the waveform changer 133 generates, as the carrier wave, a triangular wave having a period equivalent to twice the compare-match count value. This indicates that changing the compare-match count value is equivalent to changing the period of the carrier wave. For example, the period setter 122 calculates a count correction value based on the monitor value and adds the count correction value to the reference count value, thereby calculating the compare-match count value. It is to be noted that the counter value obtained by the carrier clock generator 132 may be used as the carrier wave. In this case, the waveform changer 133 may be omitted.

For example, the period setter 122 calculates the count correction value by subjecting the monitor value to a proportional operation, a proportional-integral operation, and/or a proportional-integral-derivative operation. When the monitor value is positive, the count correction value is positive, too. Therefore, the compare-match count value is larger than the reference count value. This elongates the period of one top of the carrier wave corresponding to the compare-match count value, and delays the phase of the next top. This, in turn, makes the absolute value of the monitor value smaller. When the monitor value is negative, the count correction value is negative, too. Therefore, the compare-match count value is smaller than the reference count value. This shortens the period of one top of the carrier wave corresponding to the compare-match count value, and makes the phase of the next top faster. This, in turn, makes the absolute value of the monitor value smaller.

It is to be noted that the method of calculating the count correction value by the period setter 122 will not be limited to the above-described operations, such as a proportional operation. Another possible example is that the absolute value of the count correction value is made constant, and the period setter 122 only sets the sign in front of the count correction value based on the sign in front of the monitor value. In this case, the period of the carrier wave is changed by "Bang-Bang control".

Referring again to FIG. 2, the control circuit 100 may repeat various control processings on a control period basis. For example, the pulse generator 142 may adjust the width of the pulse signal at a timing corresponding to a control period. As used herein, the phrase "timing corresponding to a control period" refers to a timing determined based on timings of start of control cycles repeated on a control period basis. In this case, the control circuit 100 may further include a control period changer 141.

The control period changer 141 changes the control period based on a change in the period of the carrier wave changed by the carrier period changer 120 so that the period of the carrier wave and the control period synchronize with each other. If the control period remains unchanged even though the period of the carrier wave has changed, there remains a discrepancy between the control periods of this apparatus and the other apparatus, even after the periods of the carrier waves of this apparatus and the other apparatus have been made to match each other. This may possibly leave a discrepancy in timing at which the width of the pulse signal is changed between this apparatus and the other apparatus. If, between this apparatus and the other apparatus, a discrepancy occurs in the timing at which the width of the pulse signal is changed, there occurs a moment(s) at which the widths of the pulse signals of this apparatus and the other apparatus differ from each other, causing a circulating current to occur. In light of this, the control period changer 141 changes the control period to make the above-described discrepancy in the timing at which the pulse width is changed difficult to occur.

The control circuit 100 may further perform: before the inverter circuit 12 starts generating driving power, changing the phase of the carrier wave to decrease the difference in the phase of the carrier wave between this apparatus and the other apparatus. For example, the control circuit 100 may make this apparatus a master or a slave relative to the other apparatus; when this apparatus is a master, the control circuit 100 may output phase information corresponding to the phase of the carrier wave generated in this apparatus to the other apparatus, while when this apparatus is a slave, the control circuit 100 may change the phase of the carrier wave based on phase information obtained from the other apparatus.

Specifically, the control circuit 100 includes a phase information outputter 144, a phase information obtainer 145, and a carrier phase changer 143. The phase information outputter 144 is used when this apparatus serves as a master relative to the other apparatus. Specifically, the phase information outputter P11 outputs the above-described phase information to the other apparatus. For example, upon switching of the carrier clock pulse generated in the carrier wave generator 130 from L level to H level (or from H level to L level), the phase information outputter 144 generates information notifying this switching and transmits the information to the other apparatus as the phase information.

The phase information obtainer 145 and the carrier phase changer 143 are used when this apparatus serves as a slave relative to the other apparatus. Specifically, the phase information obtainer 145 obtains the above-described phase information from the phase information outputter 144 of the other apparatus.

Before the inverter circuit 12 starts generating driving power, the carrier phase changer 143 changes the phase of the carrier wave to decrease the difference in the phase of the carrier wave between this apparatus and the other apparatus. The carrier phase changer 143 may change the phase of the carrier wave to decrease the phase difference to or less than half the period of the carrier wave. For example, based on the phase information obtained by the phase information obtainer 145, the carrier phase changer 143 changes the phase of the carrier wave to decrease the phase difference.

Specifically, the carrier phase changer 143 calculates a phase correction value for making the phase difference zero, and adds half the value of the phase correction value to the reference count value, thereby changing a compare-match count value equivalent to one top of the carrier wave. Upon generation of one top of the carrier wave at the changed compare-match count value, the carrier phase changer 143 returns the compare-match count value to the reference count value. By this processing, the phase correction value is added to the period of one top of the carrier wave, and the phase of the next top is changed based on the phase correction value.

For example, after the phase information obtainer 145 has obtained the phase information, the carrier phase changer 143 obtains the point of time at which the carrier clock pulse generated in the carrier wave generator 130 switched from L level to H level (or from H level to L level). This point of time will be hereinafter referred to as "time of the apex portion of the carrier wave generated in this apparatus". The carrier phase changer 143 also calculates the point of time at which the carrier clock pulse generated in the carrier wave generator 130 of the other apparatus switched from L level to H level (or from H level to L level). This point of time will be hereinafter referred to as "time of the apex portion of the carrier wave generated in the other apparatus".

Specifically, the carrier phase changer 143 subtracts communication time (the period of time for communication between this apparatus and the other apparatus) from the point of time at which the phase information obtainer 145 obtained the phase information, thereby calculating the time of the apex portion of the carrier wave generated in the other apparatus. Then, the carrier phase changer 143 subtracts the time of the apex portion of the carrier wave generated in this apparatus from the time of the apex portion of the carrier wave generated in the other apparatus, thereby calculating the phase correction value.

The control circuit 100 may perform "dead time compensation" based on one current index value corresponding to the current output from the inverter circuit 12 and the current output from the inverter circuit 12 of the other power conversion apparatus 2. In the control of the inverter circuit 12, it is necessary to prevent short-circuiting between the lines 22P and 22N. For this purpose, there is secured a short period of time (dead time) during which neither of the lines 23U, 23V and 23W is connected to any of the lines 22P and 22N, which will not be elaborated further upon here. As used herein, the term "dead time compensation" refers to correcting the voltage command value to compensate for a dead-time caused distortion of output current or output voltage (for example, a decrease in output current or output voltage).

For example, the control circuit 100 further includes a current information outputter 153, a current information obtainer 154, a distortion detector 151, and a dead time compensator 152. The current information outputter 153 obtains, from the current sensors 17U, 17V, and 17W, information on the current output from the inverter circuit 12 of this apparatus (this current will be hereinafter referred to as "this apparatus's current"), and outputs the information to the other apparatus. The current information obtainer 154 obtains, from the current information outputter 153 of the other apparatus, information on the current output from the inverter circuit 12 of the other apparatus (this current will be hereinafter referred to as "the other apparatus's current").

Based on one current index value corresponding to this apparatus's current and the other apparatus's current, the distortion detector 151 detects at least one of a current distortion and a voltage distortion caused by the dead time. Specifically, the distortion detector 151 obtains information on this apparatus's current from the current sensors 17U, 17V and 17W, and obtains information on the other apparatus's current from the current information obtainer 154. Then, the distortion detector 151 calculates, as the one current index value, the average value of this apparatus's current and the other apparatus's current. Then, the distortion detector 151 detects the current distortion and/or the voltage distortion based on the current index value.

It is to be noted that the current index value will not be limited to the average value of this apparatus's current and the other apparatus's current, insofar as the current index value corresponds to both this apparatus's current and the other apparatus's current. For example, the current index value may be the sum of this apparatus's current and the other apparatus's current.

The dead time compensator 152 corrects the width of the pulse signal based on the current distortion and/or the voltage distortion detected by the distortion detector 151. Specifically, the dead time compensator 152 calculates a voltage correction value by subjecting the value of the current distortion and/or the value of the voltage distortion calculated by the distortion detector 151 to a proportional operation, a proportional-integral operation, and/or a proportional-integral-derivative operation. Then, the dead time compensator 152 adds the voltage correction value to the voltage command value. In response, the width of the pulse signal is corrected. It is to be noted that the method of calculating the voltage correction value may vary depending on the kind of the circuit to be applied (for example, two-level inverter circuit, multi-level inverter circuit, and matrix converter circuit).

The control circuit 100 may further perform: selecting any one line of the secondary-side lines as base line; and with the base line kept in connection with any one line of the primary-side lines, controlling the inverter circuit 12 to change the connection states of how the other lines on the secondary side are connected to the other lines on the primary side (this control will be hereinafter referred to as "partial modulation control").

The control circuit 100 may further perform: controlling the inverter circuit 12 to change the connection states of how all the secondary-side lines are connected to the plurality of lines on the primary side (this control will be hereinafter referred to as "impartial modulation control"); and switching between the partial modulation control and the impartial modulation control. The control circuit 100 further includes an impartial modulation controller 161, a base line selector 164, a partial modulation controller 162, and a modulation method switcher 163.

The impartial modulation controller 161 performs the impartial modulation control. Specifically, the impartial modulation controller 161 controls the inverter circuit 12 to change the connection states of how all the lines 23U, 23V, and 23W, which are on the secondary side, are connected to the lines 22P and 22N, which are on the primary side.

The base line selector 164 selects any one line of the secondary-side lines as the base line (base phase). Specifically, the base line selector 164 selects, as the base line, any one line from the lines 23U, 23V, and 23W, which are on the secondary side. In this respect, the base line selector 164 switches which line to select as the base line based on a change in, for example, the voltage command value (voltage command value on the secondary side). The switching of which line to select as the base line will be hereinafter referred to as "base switching". The base line selector 164 may perform a base switching at a timing corresponding to the control period. The base line selector 164 may select, as the base line, any one line from the secondary-side lines based on the phase of the current command value (current command value on the secondary side).

The partial modulation controller 162 performs the partial modulation control. The partial modulation controller 162 performs: controlling the inverter circuit 12 to, with the selected base line connected to any one line of the lines 22P and 22N, change the connection states of how the rest of the lines 23U, 23V and 23W (the other two lines, excluding the base line) are connected to the lines 22P and 22N.

It is to be noted that the terms "primary side" and "secondary side" are only used for the purpose of distinguishing one side and the other side of the inverter circuit 12 from each other. In this example, the lines 22P and 22N, which are on the power source PS side, are regarded as "primary side", and the lines 23U, 23V, and 23W, which are on the load LD side, are regarded as "secondary side". This, however, is not intended in a limiting sense. It is also possible, depending on the type of the power converter, to regard the lines on the power source PS side as "secondary side" and regard the lines on the load LD side as "primary side". For example, when the power converter is a PWM converter circuit, the lines on the power source PS side (the lines 23U, 23V, and 23W) may be regarded as "secondary side", and the lines on the load LD side (the lines 22P and 22N) may be regarded as "primary side". For further example, when the power converter is a matrix converter circuit, the lines on the power source PS side (the lines 21R, 21S, and 21T) may be regarded as "primary side".

The modulation method switcher 163 switches the method of the modulation performed by the inverter circuit 12 between a modulation performed by the impartial modulation controller 161 and a modulation performed by the partial modulation controller 162. Specifically, the modulation method switcher 163 switches the modulation method based on, for example, the level of the voltage command value and/or the frequency of the voltage command value. The switching of the modulation method will be hereinafter referred to as "method switching".

In the base switching as well, the control circuit 100 may make this apparatus a master or a slave relative to the other apparatus; when this apparatus is a master, the control circuit 100 may output information on the timing of the base switching to the other apparatus, while when this apparatus is a slave, the control circuit 100 may perform the base switching based on information on the timing of the base switching obtained from the other apparatus. In the method switching as well, the control circuit 100 may make this apparatus a master or a slave relative to the other apparatus; when this apparatus is a master, the control circuit 100 may output information on the timing of the method switching to the other apparatus, while when this apparatus is a slave, the control circuit 100 may perform the method switching based on information on the timing of the method switching obtained from the other apparatus. Specifically, the control circuit 100 further includes a switching information outputter 165 and a switching information obtainer 166.

The switching information outputter 165 is used when this apparatus is a master. Specifically, the switching information outputter 165 obtains, from the base line selector 164, information indicating the timing of the base switching, and outputs the information to the other apparatus. The information indicating the timing of the base switching may be information indicating that now is the timing of the base switching (this information will be hereinafter referred to as "base switching command"), or may be information indicating that the timing of the base switching is later than now (this information will be hereinafter referred to as "scheduled base switching information").

The switching information outputter 165 also obtains, from the modulation method switcher 163, information indicating the timing of the method switching, and outputs the information to the other apparatus. The information indicating the timing of the method switching may be information indicating that now is the timing of the method switching (this information will be hereinafter referred to as "method switching command"), or may be information indicating that the timing of the method switching is later than now (this information will be hereinafter referred to as "scheduled method switching information").

The switching information obtainer 166 is used when this apparatus is a slave. The switching information obtainer 166 obtains information indicating the timing of the base switching from the switching information outputter 165 of the other apparatus. The switching information obtainer 166 also obtains information indicating the timing of the method switching from the switching information outputter 165 of the other apparatus.

When the control circuit 100 selects a new line as the base line and switches the present base line to the new line, the timing of the switching may be based on the timing at which the other apparatus selects a new line as the base line and switches the present base line to the new line (this timing will be hereinafter referred to as "base switching timing"). When the control circuit 100 switches the modulation method, the timing of the switching may be based on the timing at which the other apparatus switches the modulation method (this timing will be hereinafter referred to as "method switching timing"). In this case, the control circuit 100 may make this apparatus a master or a slave relative to the other apparatus; when this apparatus is a master, the control circuit 100 may output information on the base switching timing and the method switching timing to the other apparatus, while when this apparatus is a slave, the control circuit 100 may determine the base switching timing and the method switching timing based on information obtained from the other apparatus.

When the control circuit 100 makes this apparatus a slave and makes the other apparatus a master, the base line selector 164 performs the base switching based on the timing at which the base line selector 164 of the other apparatus performs the base switching. Specifically, the base line selector 164 performs the base switching at a timing synchronized with the timing at which the base line selector 164 of the other apparatus performs the base switching. As used herein, the term "synchronized" is intended to mean "substantially synchronized" or "approximately synchronized", which tolerate a negligible level of difference in timing, as well as meaning "precisely synchronized". The same applies in the following description. Also as used herein, the phrase "a negligible level of difference in timing" is intended to mean that a circulating current caused by the difference is negligible in level.

When the switching information obtainer 166 obtains the scheduled base switching information, the base line selector 164 may perform the base switching at the scheduled timing indicated by the scheduled base switching information. When the control circuit 100 makes this apparatus a master, the modulation method switcher 163 performs the method switching based on the level of the voltage command value on the secondary side.

When the control circuit 100 makes this apparatus a slave and makes the other apparatus a master, the modulation method switcher 163 performs the method switching based on the timing at which the modulation method switcher 163 of the other apparatus performs the method switching. Specifically, the modulation method switcher 163 performs the base switching at a timing synchronized with the timing at which the modulation method switcher 163 of the other apparatus performs the method switching.

Figure 5:
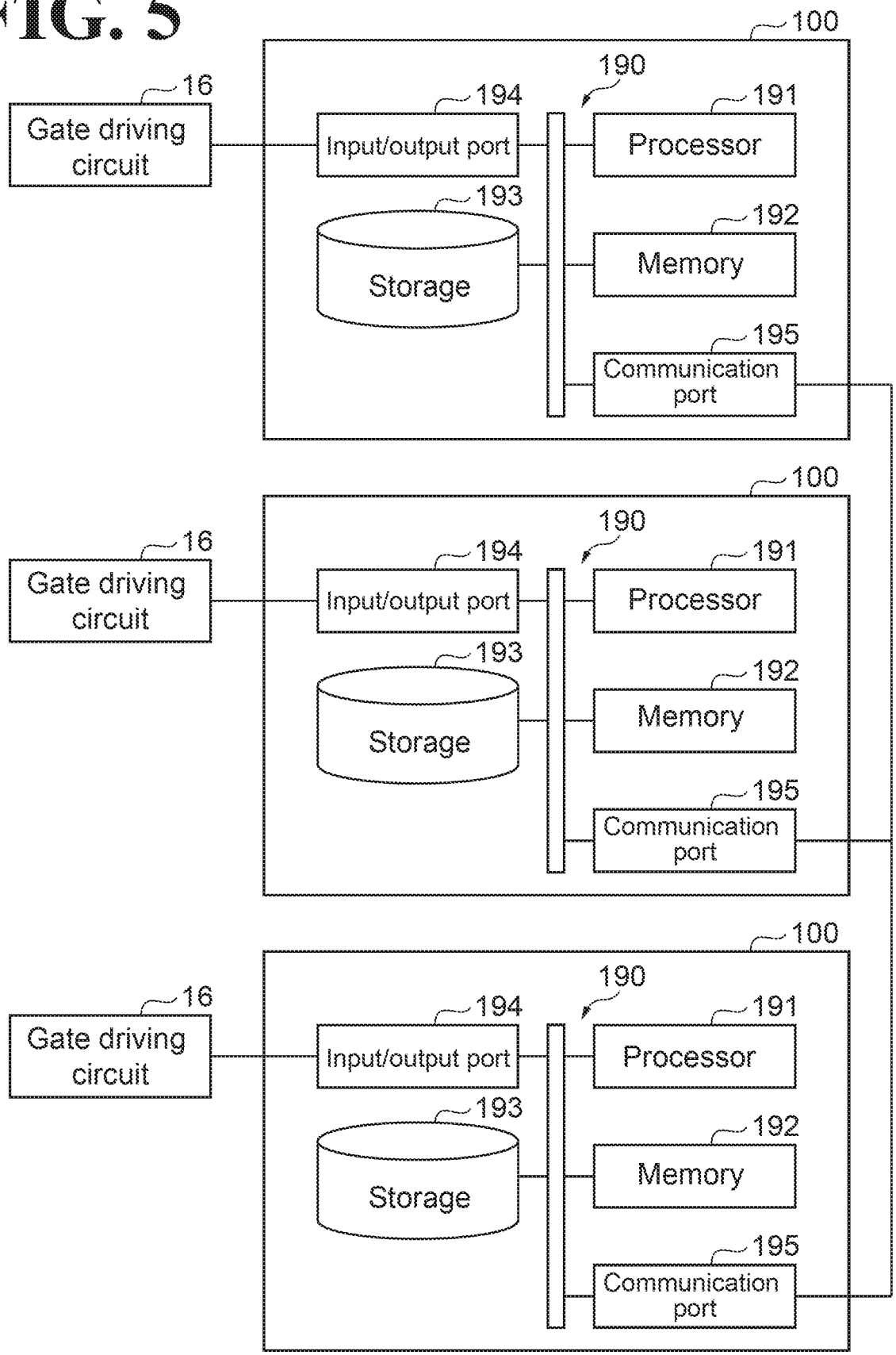
FIG. 5 is a block diagram illustrating example hardware configurations of controllers.

FIG. 5 is a block diagram illustrating example hardware configurations of the control circuits 100. As illustrated in FIG. 5, each control circuit 100 at least includes one processor 191, a memory 192, a storage 193, an input/output port 194, and a communication port 195.

The storage 193 includes a computer-readable storage medium such as a nonvolatile semiconductor memory. The storage medium stores programs for implementing the various functions of the control circuit 100. The storage 193 stores a program for causing the control circuit 100 to perform: generating a carrier wave; generating a pulse signal synchronized with the carrier wave; causing the inverter circuit 12 to generate power that is based on the width of the pulse signal; obtaining a monitor value corresponding to a circulating current circulating between the power conversion apparatus 2 and the other power conversion apparatus; and based on a monitor value obtained while the inverter circuit 12 is generating driving power, changing the carrier period to decrease the circulating current.

The storage 193 may store a program for causing the control circuit 100 to perform: based on one current index value corresponding to the current output from the inverter circuit 12 of this apparatus and the current output from the inverter circuit 12 of the other apparatus, detecting a current distortion and/or a voltage distortion caused by the dead time of the inverter circuit 12; and correcting the width of the pulse signal based on the detected current distortion and/or the detected voltage distortion. The storage 193 may store a program for causing the control circuit 100 to perform: outputting information on the timing of the base switching to the other apparatus; and outputting information on the timing of the method switching to the other apparatus. The storage 193 may store a program for causing the control circuit 100 to perform: performing the base switching based on information on the timing of the base switching obtained from the other apparatus; and performing the method switching based on information on the timing of the method switching obtained from the other apparatus.

The memory 192 temporarily stores: programs loaded from the storage medium of the storage 193; and operation results obtained by the processor 191. The processor 191 cooperates with the memory 192 to perform the programs, thereby implementing the above-described functional modules. The input/output port 194, at a command from the processor 191, inputs and outputs electric signals from and to the gate driving circuit 16. The communication port 195, at a command from the processor 191, performs information communication with the control circuit 100 of the other apparatus.

It is to be noted that the functions of the control circuit 100 may not necessarily be implemented by programs. For example, at least one of the functions of the control circuit 100 may be implemented by a dedicated logic circuit or an integrated application specific integrated circuit (ASIC).

1. 3 Method for Converting Power

An example method for converting power will be described below. The example method includes procedures performed by the power conversion apparatus 2 of the power conversion system 1, namely, a procedure for outputting driving power; a procedure for phase adjustment of the carrier wave performed before the start of driving power output; a procedure for dead time compensation; a base switching procedure on the master side; a base switching procedure on the slave side; a method switching procedure on the master side; and a method switching procedure on the slave side.

Procedure for Outputting Driving Power

The procedure for outputting driving power includes: generating a carrier wave; generating a pulse signal synchronized with the carrier wave; causing the inverter circuit 12 to generate power that is based on the width of the pulse signal; obtaining a monitor value corresponding to a circulating current circulating between the power conversion apparatus 2 and another power conversion apparatus 2; and based on a monitor value obtained while the inverter circuit 12 is generating driving power, changing the carrier period to decrease the circulating current.

Figure 6:
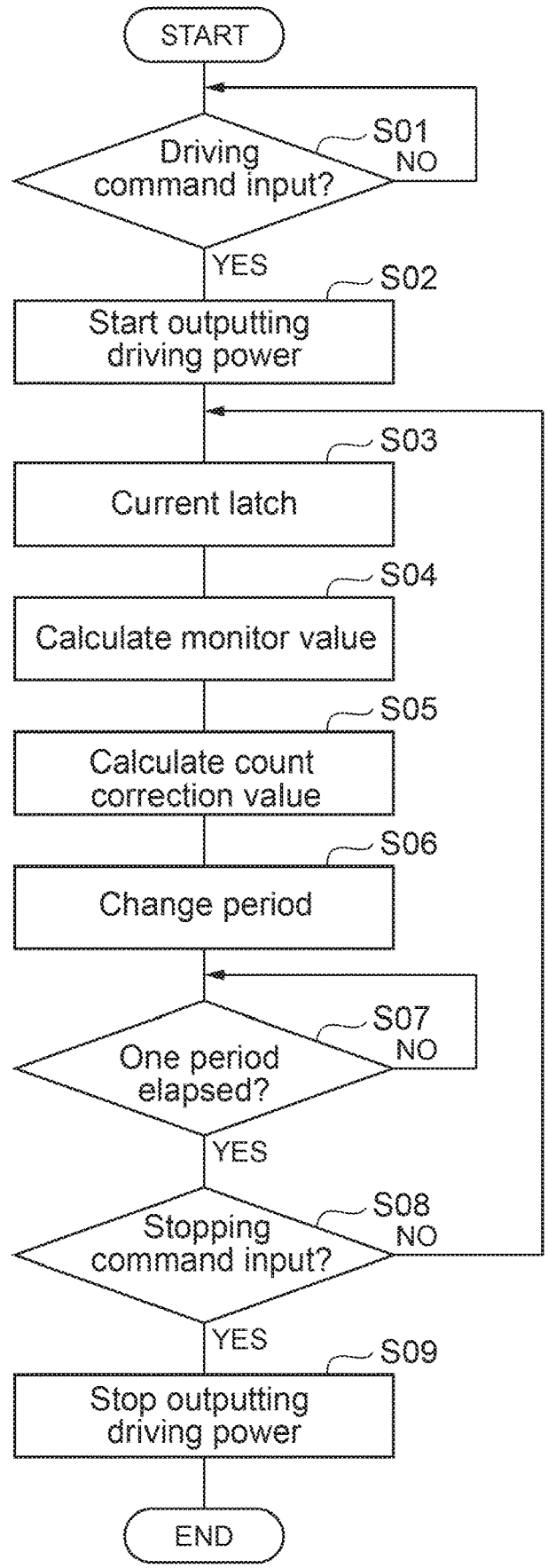
FIG. 6 is a flowchart of an example procedure for outputting driving power.

As illustrated in FIG. 6, the control circuit 100 first performs steps S01, S02, S03, and S04. At step S01, the driving pulse generator 146 waits for input of a driving command. The driving command may be input by a user or input from an upper-level controller. At step S02, the driving pulse generator 146 generates, synchronously with the carrier wave, a pulse signal for outputting driving power, and starts outputting the pulse signal to the gate driving circuit 16. This causes the inverter circuit 12 to start outputting driving power that is based on the width of the pulse signal. At step S03, the circulating current monitor 110 obtains and holds the top-portion U-phase current value, the top-portion V-phase current value, the top-portion W-phase current value, the bottom-portion U-phase current value, the bottom-portion V-phase current value, and the bottom-portion W-phase current value. At step S04, the circulating current monitor 110 calculates a monitor value by calculating the sum of the difference between the top-portion U-phase current value and the bottom-portion U-phase current value, the difference between the top-portion V-phase current value and the bottom-portion V-phase current value, and the difference between the top-portion W-phase current value and the bottom-portion W-phase current value.

Next, the control circuit 100 performs steps S05, S06, S07, and S08. At step S05, the carrier period changer 120 calculates a count correction value based on the monitor value. At step S06, the carrier period changer 120 adds the count correction value to the reference count value, thereby changing the above-described compare-match count value. This causes the carrier period to be changed. At step S07, the driving pulse generator 146 waits for the carrier period to elapse. At step S08, the driving pulse generator 146 checks whether a stopping command has been input. The stopping command may be input by a user or input from an upper-level controller.

Upon determining at step S08 that no stopping command has been input, the control circuit 100 returns the processing to step S03. In the processings that follow, the circulating current is repeatedly decreased by changing the carrier period based on the monitor value.

Upon determining at step S08 that a stopping command has been input, the control circuit 100 performs step S09. At step S09, the driving pulse generator 146 stops outputting, to the gate driving circuit 16, the pulse signal for outputting driving power. Thus, the procedure for outputting driving power is completed.

Procedure for Phase Adjustment

The procedure for phase adjustment includes, before the inverter circuit 12 starts generating driving power, changing the phase of the carrier wave to decrease the difference in the phase of the carrier wave between this apparatus and the other apparatus. Specifically, the procedure for phase adjustment includes: causing the master power conversion apparatus 2 to output, to the other apparatus, phase information corresponding to the phase of the carrier wave generated in this apparatus; and causing the slave power conversion apparatus 2 to change the phase of the carrier wave based on phase information obtained from the other apparatus.

Figure 7:
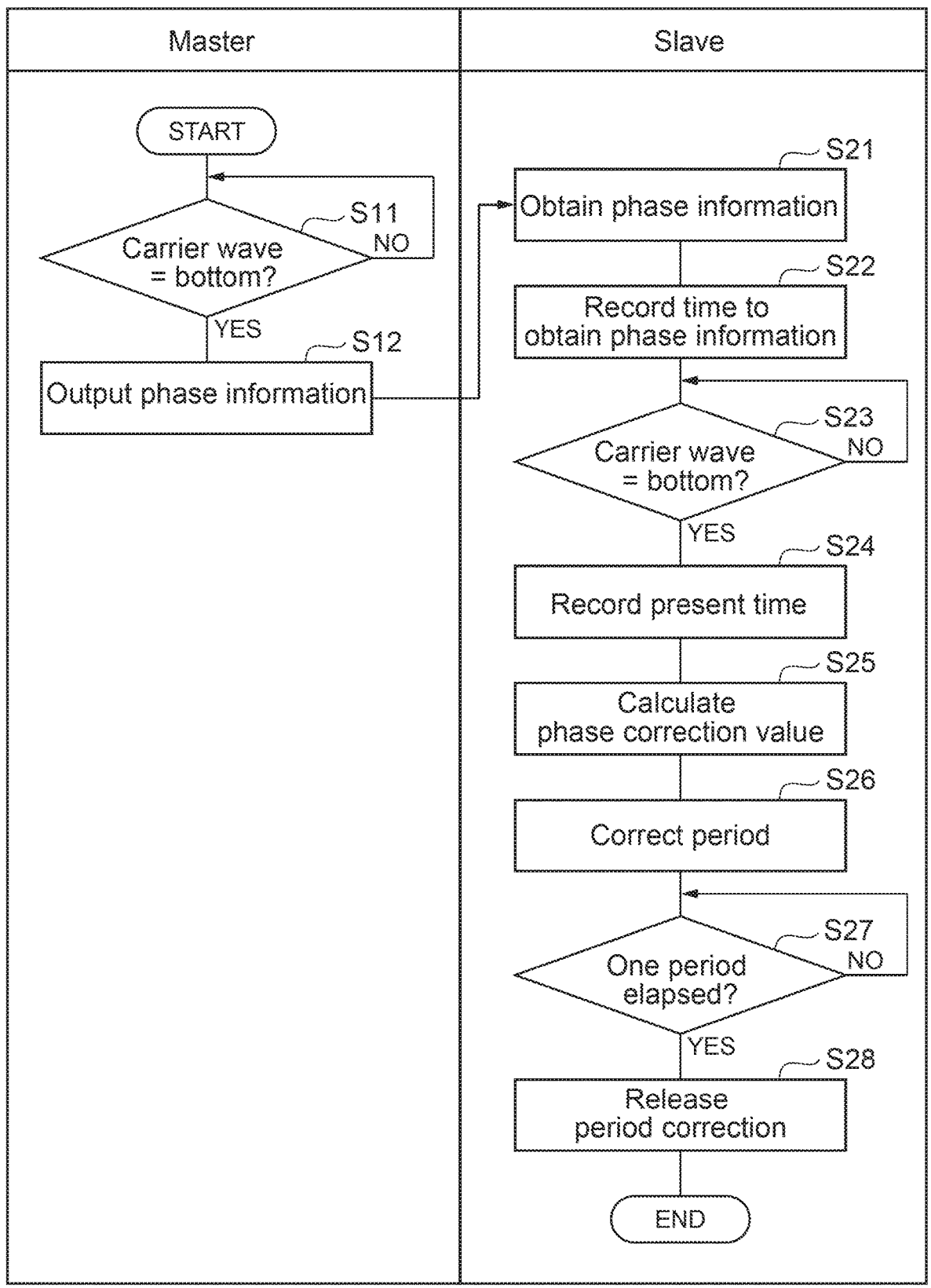
FIG. 7 is a flowchart of an example procedure for phase adjustment of carrier wave performed before the start of driving power output.

As illustrated in FIG. 7, the control circuit 100 of the master power conversion apparatus 2 performs steps S11 and S12. At step S11, the phase information outputter 144 waits for the timing at which the carrier clock pulse switches from L level to H level (timing corresponding to a bottom portion of the carrier wave). At step S12, the phase information outputter 144 outputs, to the slave power conversion apparatus 2, phase information notifying that the carrier clock pulse has switched from L level to H level (the carrier wave has reached the bottom portion).

Then, the control circuit 100 of the slave power conversion apparatus 2 performs steps S21, S22, S23, and S24. At step S21, the phase information obtainer 145 obtains the phase information output from the master power conversion apparatus 2. At step S22, the phase information obtainer 145 records the point of time at which the phase information was obtained. At step S23, the carrier phase changer 143 waits for the timing at which the carrier clock pulse switches from L level to H level (timing corresponding to a bottom portion of the carrier wave). At step S24, the carrier phase changer 143 records the point of time at which the carrier wave reached the bottom portion (this point of time will be hereinafter referred to as "time of the apex portion of the carrier wave").

Next, the control circuit 100 of the slave power conversion apparatus 2 performs steps S25, S26, S27, and S28. At step S25, the carrier phase changer 143 subtracts the time of the apex portion of the carrier wave on the slave side from the time of the apex portion of the carrier wave on the master side, thereby calculating a phase correction value. The carrier phase changer 143 subtracts communication time (the period of time for communication between this apparatus and the other apparatus) from the point of time at which the phase information obtainer 145 obtained the phase information, thereby calculating the time of the apex portion of the carrier wave on the master side. At step S26, the carrier phase changer 143 adds half the value of the phase correction value to the reference count value, thereby changing a compare-match count value equivalent to one top of the carrier wave. At step S27, the carrier phase changer 143 waits the carrier period to elapse. At step S28, the carrier phase changer 143 returns the compare-match count value to the reference count value. Thus, the procedure for phase adjustment is completed.

Procedure for Dead Time Compensation

The procedure for dead time compensation includes: based on one current index value corresponding to this apparatus's current (the current output from the inverter circuit 12 of this apparatus) and the other apparatus's current (the current output from the inverter circuit 12 of the other apparatus), detecting a current distortion and/or a voltage distortion caused by the dead time of the inverter circuit 12; and correcting the width of the pulse signal based on the detected current distortion and/or the detected voltage distortion.

Figure 8:
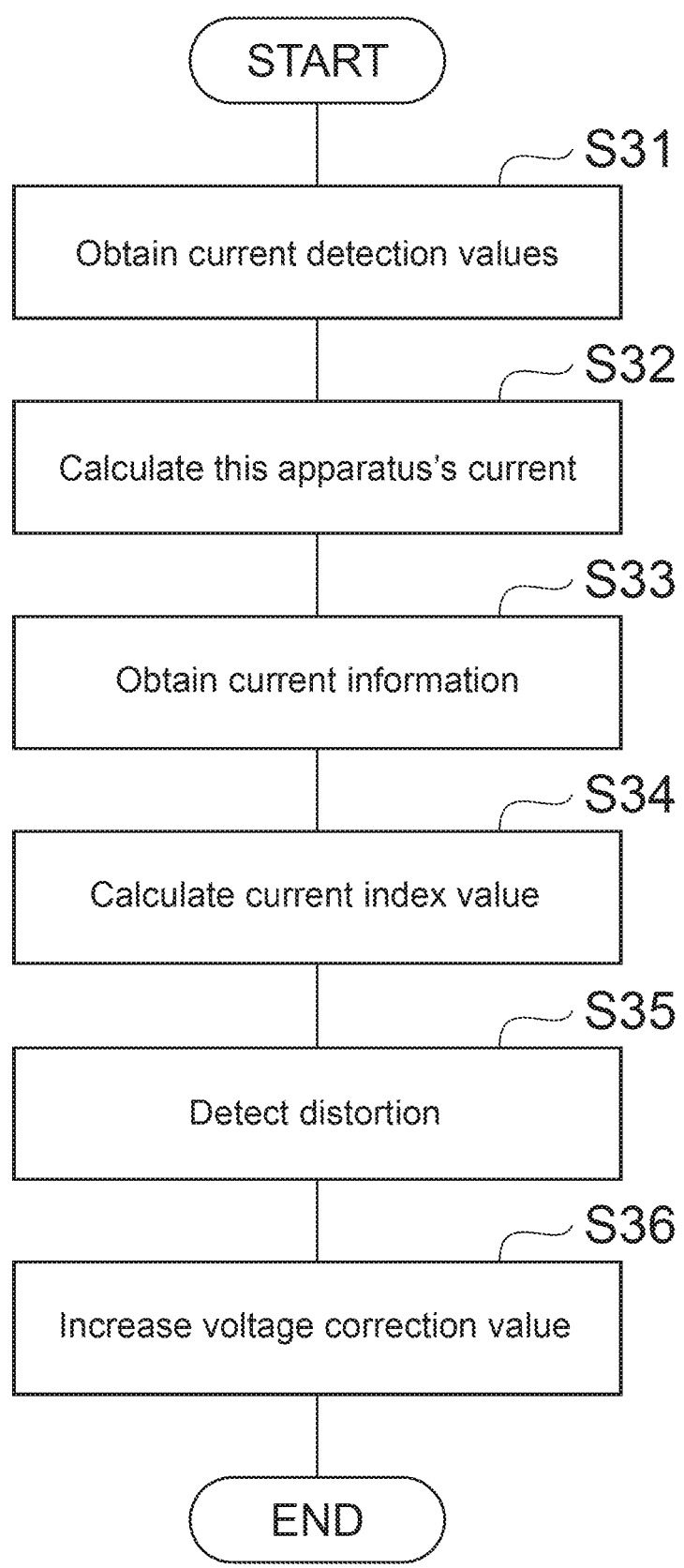
FIG. 8 is a flowchart of an example procedure for dead time compensation.

As illustrated in FIG. 8, the control circuit 100 performs steps S31, S32, S33, and S34. At step S31, the distortion detector 151 obtains detection values of current from the current sensors 17U, 17V, and 17W. At step S32, the distortion detector 151 synthesizes the detection values of current obtained from the current sensors 17U, 17V, and 17W, thereby calculating this apparatus's current. At step S33, the current information obtainer 154 obtains, from the current information outputter 153 of the other apparatus, the other apparatus's current, which has been calculated in the other apparatus in a manner similar to the manner in which this apparatus's current was calculated. At step S34, the distortion detector 151 calculates one current index value corresponding to this apparatus's current and the other apparatus's current. Specifically, the distortion detector 151 calculates, as the one current index value, the average value of this apparatus's current and the other apparatus's current.

Next, the control circuit 100 performs steps S35 and S36. At step S35, the distortion detector 151 detects, based on the current index value, at least one of a current distortion and a voltage distortion caused by the dead time of the inverter circuit 12. At step S36, the dead time compensator 152 corrects the width of the pulse signal based on the current distortion and/or the voltage distortion detected by the distortion detector 151. Specifically, the dead time compensator 152 calculates a voltage correction value based on the detected current distortion and/or the detected voltage distortion, and adds or subtracts the voltage correction value to or from the voltage command value. In response, the width of the pulse signal is corrected. Thus, the procedure for dead time compensation is completed.

Base Switching Procedure on the Master Side

The base switching procedure in the master power conversion apparatus 2 includes: obtaining, from the base line selector 164, information indicating the base switching timing; and outputting the information to the slave power conversion apparatus 2.

Figure 9:
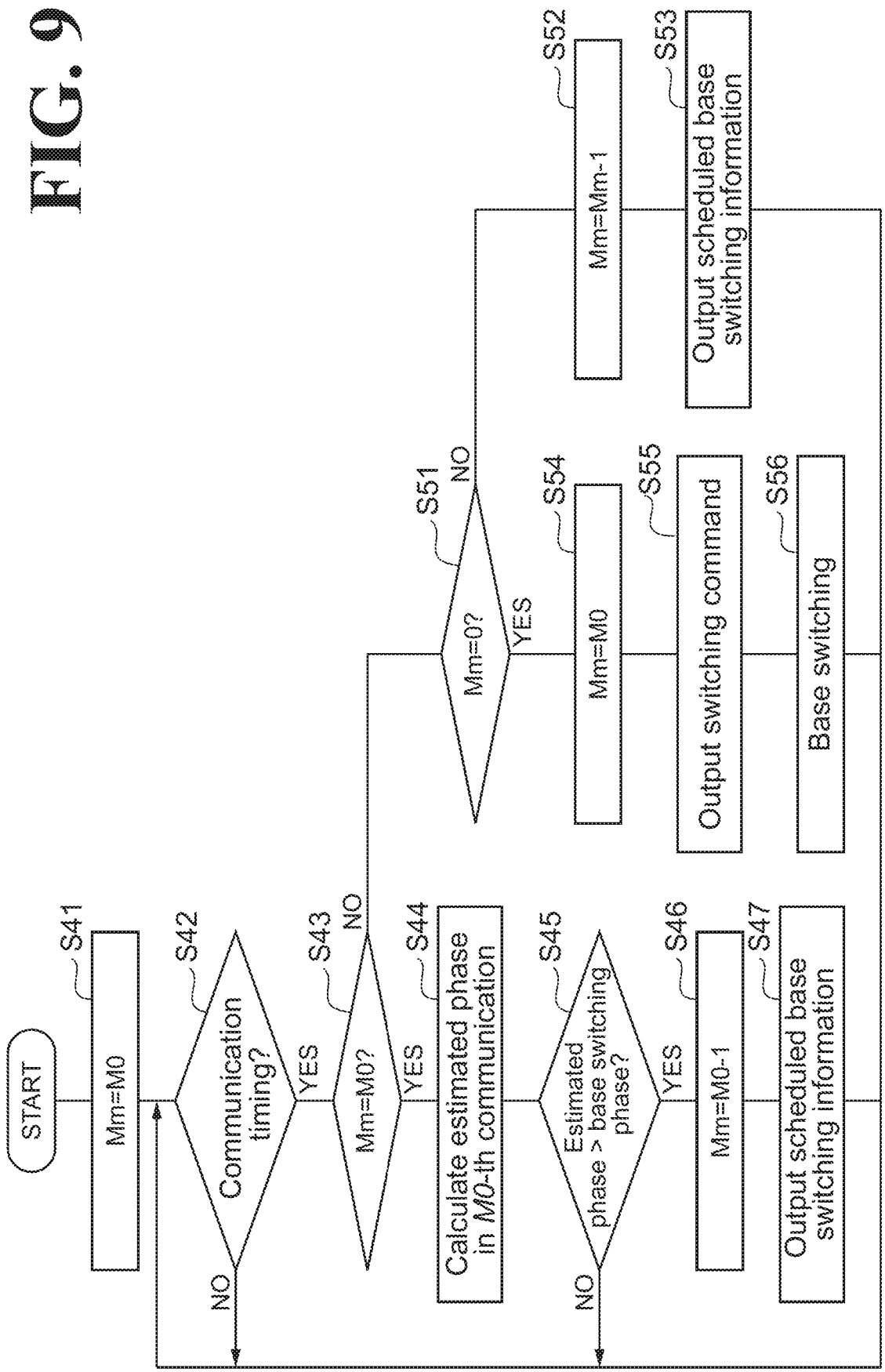
FIG. 9 is a flowchart of an example procedure for base line switching performed in bi-phase modulation on the master side.

As illustrated in FIG. 9, the control circuit 100 performs steps S41, S42, and S43. At step S41, the switching information outputter 165 sets repetition number Mm (which denotes how many times information has been transmitted to the slave power conversion apparatus 2) at initial value M0. At step S42, the switching information outputter 165 waits for the communication timing. At step S43, the switching information outputter 165 checks whether the repetition number Mm is the initial value M0.

Upon determining at step S43 that the repetition number Mm is the initial value M0, the control circuit 100 performs steps S44 and S45. At step S44, the base line selector 164 calculates an estimated phase of the voltage command value in the M0-th communication. Specifically, the switching information outputter 165 multiplies the frequency of the voltage command value by the period of time equivalent to M0-th times of communication. Then, the switching information outputter 165 adds the obtained product to the present phase of the voltage command value, thereby calculating the estimated phase. At step S45, the base line selector 164 checks whether the estimated phase is in excess of the phase next to be subjected to base line switching (this phase will be hereinafter referred to as "next switched phase").

Upon determining at step S45 that the estimated phase is not in excess of the next switched phase, the control circuit 100 returns the processing to step S42. In the processings that follow, an estimated phase is repeatedly calculated until the estimated phase exceeds the next switched phase.

Upon determining at step S45 that the estimated phase is in excess of the next switched phase, the control circuit 100 performs steps S46 and S47. At step S46, the switching information outputter 165 counts down the repetition number in by one. At step S47, the switching information outputter 165 outputs the scheduled base switching information to the slave power conversion apparatus 2. Specifically, the switching information outputter 165 outputs the present value of the repetition number Mm as the scheduled base switching information. The present value of the repetition number Mm is equivalent to information announcing that a base switching command will be output at the time of communication after Mm repetitions. Then, the control circuit 100 returns the processing to step S42.

Upon determining at step S43 that the repetition number Mm is not the initial value M0, the control circuit 100 performs step S51. At step S51, the switching information outputter 165 checks whether the repetition number Mm is zero.

Upon determining at step S51 that the repetition number in is not zero, the control circuit 100 performs steps S52 and S53. At step S52, the switching information outputter 165 counts down the repetition number Mm by one. At step S53, the switching information outputter 165 outputs the scheduled base switching information to the slave power conversion apparatus 2. Specifically, the switching information outputter 165 outputs the present value of the repetition number Mm as the scheduled base switching information. Then, the control circuit 100 returns the processing to step S42. In the processings that follow, the repetition number Mm is repeatedly counted down and the scheduled base switching information is repeatedly output until the repetition number Mm becomes zero.

Upon determining at step S51 that the repetition number Mm is zero, the control circuit 100 performs steps S54, S55, and S56. At step S54, the switching information outputter 165 returns the repetition number Mm to the initial value M0. At step S55, the switching information outputter 165 outputs the base switching command. At step S56, the base line selector 164 performs the base switching. Then, the control circuit 100 returns the processing to step S42. In the processings that follow, this procedure is repeated.

Base Switching Procedure on the Slave Side

Figure 10:
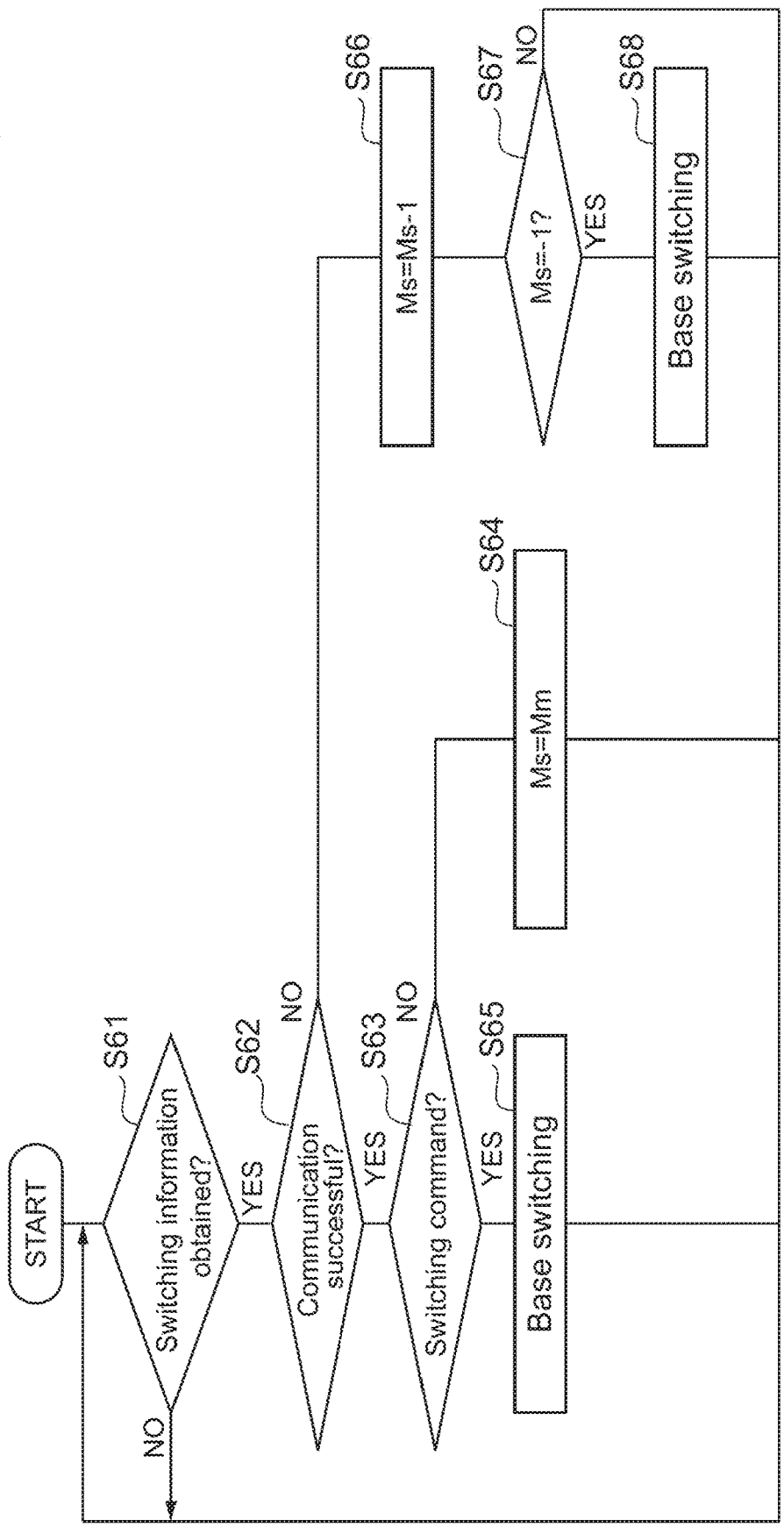
FIG. 10 is a flowchart of an example procedure for base line switching performed in bi-phase modulation on the slave side.

The base switching procedure in the slave power conversion apparatus 2 includes performing the base switching based on the timing at which the master power conversion apparatus 2 performs the base switching. As illustrated in FIG. 10, the control circuit 100 performs steps S61 and S62. At step S61, the switching information obtainer 166 waits for information on the timing of the base switching to be obtained. At step S62, the switching information obtainer 166 checks whether a communication for obtaining the information was successful. To checks whether the communication was successful, it is possible, for example, to use a parity bit.

Upon determining at step S62 that the communication was successful, the control circuit 100 performs step S63. At step S63, the base line selector 164 checks whether the information on the timing of the base switching is a base switching command.

Upon determining at step S63 that the information on the timing of the base switching is not a base switching command, the control circuit 100 performs step S64. At step S64, the base line selector 164 renders repetition number Ms into the repetition number Mm of information transmission. The repetition number Ms denotes how many times information from the master power conversion apparatus 2 has been received. After step S64, the control circuit 100 returns the processing to step S61. In the processings that follow, the repetition number Ms is updated based on the scheduled base switching information every time the scheduled base switching information is successfully received.

Upon determining at step S63 that the information on the timing of the base switching is a base switching command, the control circuit 100 performs step S65. At step S65, the base line selector 164 immediately performs the base switching. Then, the control circuit 100 returns the processing to step S61.

Upon determining at step S62 that the communication was not successful, the control circuit 100 performs steps S66 and S67. At step S66, the base line selector 164 counts down the repetition number Ms by one. At step S67, the base line selector 164 checks whether the repetition number Ms is minus 1.

Upon determining at step S67 that the repetition number Ms is not minus 1, the control circuit 100 returns the processing to step S61.

Upon determining at step S67 that the repetition number Ms is minus 1, the control circuit 100 performs step S68. At step S68, the base line selector 164 immediately performs the base switching. Then, the control circuit 100 returns the processing to step S61. In the processings that follow, this procedure is repeated.

In the procedure described above, once the scheduled base switching information is successfully received, the repetition number Ms of information reception is rendered into the repetition number Mm of information transmission at step S64. Then, by counting down the repetition number Ms of information reception, the base switching is performed based on the scheduled base switching information. This ensures that the base switching is performed more reliably based on the base switching timing on the master side.

Method Switching Procedure on the Master Side

Figure 11:
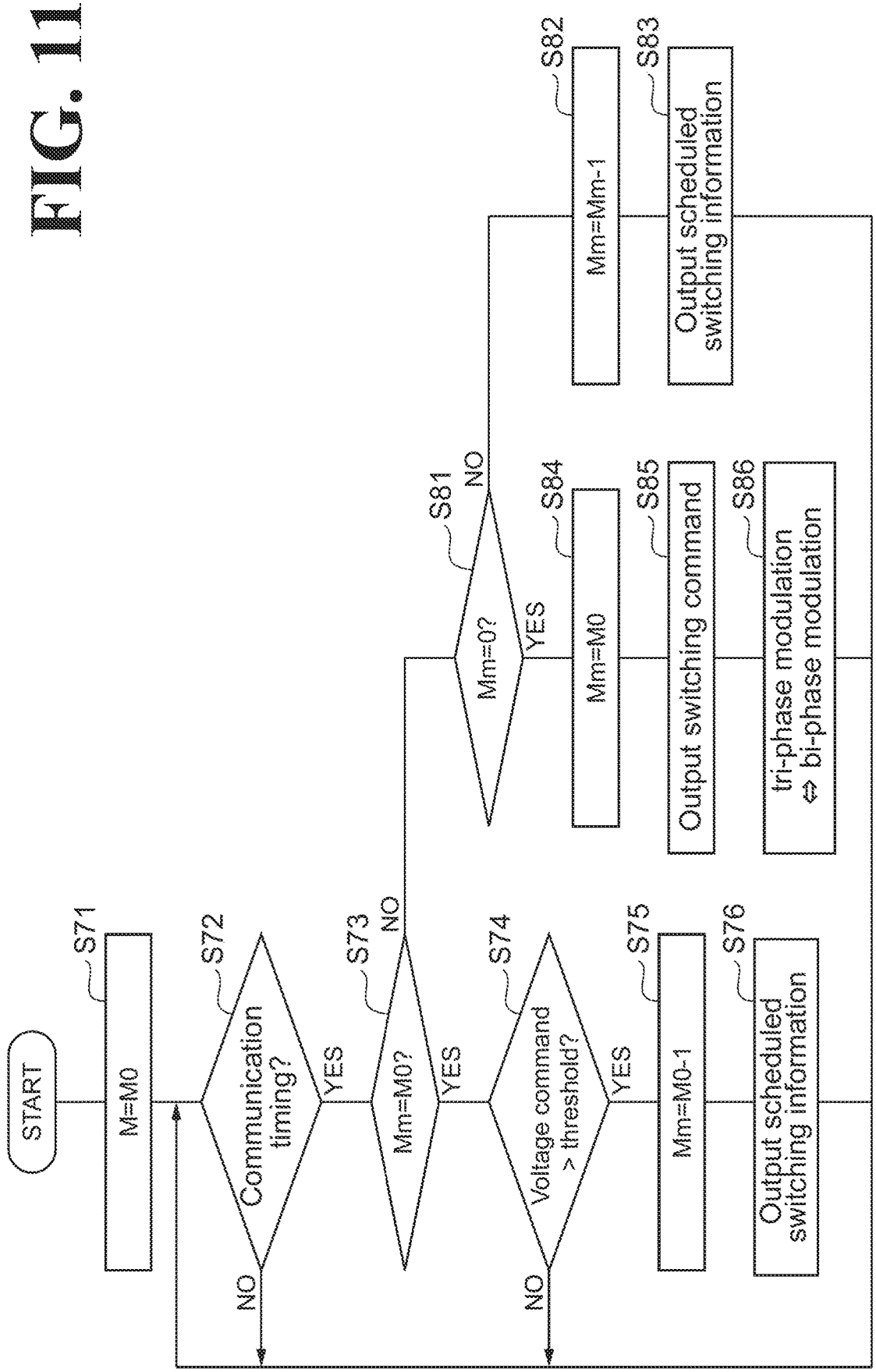
FIG. 11 is a flowchart of an example procedure for modulation method switching performed on the master side.

The method switching procedure in the master power conversion apparatus 2 includes outputting information indicating the timing of the method switching to the slave power conversion apparatus 2. FIG. 11 illustrates an example procedure for switching between tri-phase modulation control (impartial modulation control) and bi-phase modulation control (partial modulation control). As illustrated in FIG. 11, the control circuit 100 performs steps S71, S72, and S73. At step S71, the switching information outputter 165 sets the repetition number Mm at the initial value M0. At step S72, the switching information outputter 165 waits for the timing of communication. At step S73, the switching information outputter 165 checks whether the repetition number Mm is the initial value M0.

Upon determining at step S73 that the repetition number Mm is the initial value M0, the control circuit 100 performs step S74. At step S74, the modulation method switcher 163 checks whether the voltage command value is in excess of a method switching threshold. Upon determining at step S74 that the voltage command value is not in excess of the method switching threshold, the control circuit 100 returns the processing to step S72. In the processings that follow, the voltage command value is repeatedly checked until the voltage command value exceeds the method switching threshold.

Upon determining at step S74 that the voltage command value is in excess of the method switching threshold, the control circuit 100 performs steps S75 and S76. At step S75, the switching information outputter 165 counts down Mm by one. At step S76, the switching information outputter 165 outputs the scheduled method switching information to the slave power conversion apparatus 2. Specifically, the switching information outputter 165 outputs the present value of the repetition number Mm as the scheduled method switching information. The present value of the repetition number Mm is equivalent to information announcing that a method switching command will be output at the time of communication after Mm repetitions. Then, the control circuit 100 returns the processing to step S72.

Upon determining at step S73 that the repetition number Mm is not the initial value M0, the control circuit 100 performs step S81. At step S81, the switching information outputter 165 checks whether the repetition number Mm is zero.

Upon determining at step S81 that the repetition number Mm is not zero, the control circuit 100 performs steps S82 and S83. At step S82, the switching information outputter 165 counts down the repetition number Mm by one. At step S83, the switching information outputter 165 outputs the scheduled method switching information to the slave power conversion apparatus 2. Specifically, the switching information outputter 165 outputs the present value of the repetition number Mm as the scheduled method switching information. Then, the control circuit 100 returns the processing to step S72. In the processings that follow, the repetition number Mm is repeatedly counted down and the scheduled method switching information is repeatedly output until the repetition number Mm becomes zero.

When at step S81 the repetition number Mm is zero, the control circuit 100 performs steps S84, S85, and S86. At step S84, the switching information outputter 165 returns the repetition number Mm to the initial value M0. At step S85, the switching information outputter 165 outputs the method switching command. At step S86, the modulation method switcher 163 performs method switching between tri-phase modulation control (impartial modulation control) and bi-phase modulation control (partial modulation control). Then, the control circuit 100 returns the processing to step S72. In the processings that follow, this procedure is repeated.

Method Switching Procedure on the Slave Side

Figure 12:
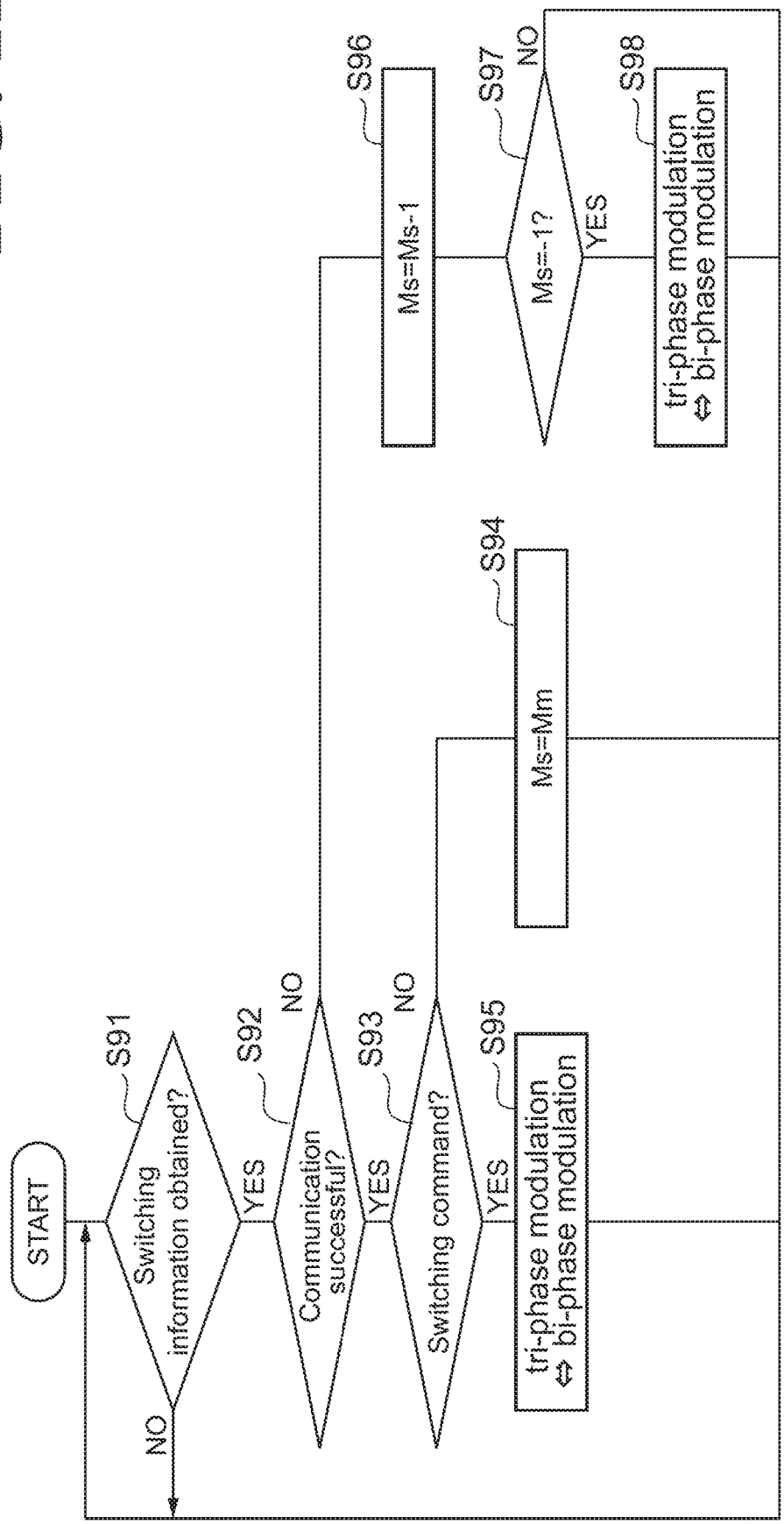
FIG. 12 is a flowchart of an example procedure for modulation method switching performed on the slave side.

The base switching procedure in the slave power conversion apparatus 2 includes performing the method switching based on the timing at which the master power conversion apparatus 2 performs the method switching. As illustrated in FIG. 12, the control circuit 100 performs steps S91 and S92. At step S91, the switching information obtainer 166 waits for information on the timing of the method switching to be obtained. At step S92, the switching information obtainer 166 checks whether a communication for obtaining the information was successful. To checks whether the communication was successful, it is possible, for example, to use a parity bit.

Upon determining at step S92 that the communication was successful, the control circuit 100 performs step S93. At step S93, the modulation method switcher 163 checks whether the information on the timing of the method switching is a method switching command.

Upon determining at step S93 that the information on the timing of the method switching is not a method switching command, the control circuit 100 performs step S94. At step S94, the modulation method switcher 163 renders the repetition number Ms into the repetition number Mm. After step S94, the control circuit 100 returns the processing to step S91. In the processings that follow, the repetition number Ms is updated based on the scheduled method switching information every time the scheduled method switching information is successfully received.

Upon determining at step S93 that the information on the timing of the method switching is a method switching command, the control circuit 100 performs step S95. At step S95, the modulation method switcher 163 immediately performs the method switching. Then, the control circuit 100 returns the processing to step S91.

Upon determining at step S92 that the communication was not successful, the control circuit 100 performs steps S96 and S97. At step S96, the modulation method switcher 163 counts down the repetition number Ms by one. At step S97, the modulation method switcher 163 checks whether the repetition number Ms is minus 1.

Upon determining at step S97 that the repetition number Ms is not minus 1, the control circuit 100 returns the processing to step S91.

Upon determining at step S97 that the repetition number Ms is minus 1, the control circuit 100 performs step S98. At step S98, the modulation method switcher 163 immediately performs the base switching. Then, the control circuit 100 returns the processing to step S91. In the processings that follow, this procedure is repeated.

In the procedure described above, once the scheduled method switching information is successfully received, the repetition number Ms of information reception is rendered into the repetition number Mm of information transmission at step S94. Then, by counting down the repetition number Ms, the method switching is performed based on the scheduled method switching information. This ensures that the method switching is performed more reliably based on the timing of the method switching on the master side.

2. Second Embodiment

2. 1 Power Conversion Apparatus According to Second Embodiment

Figure 13:
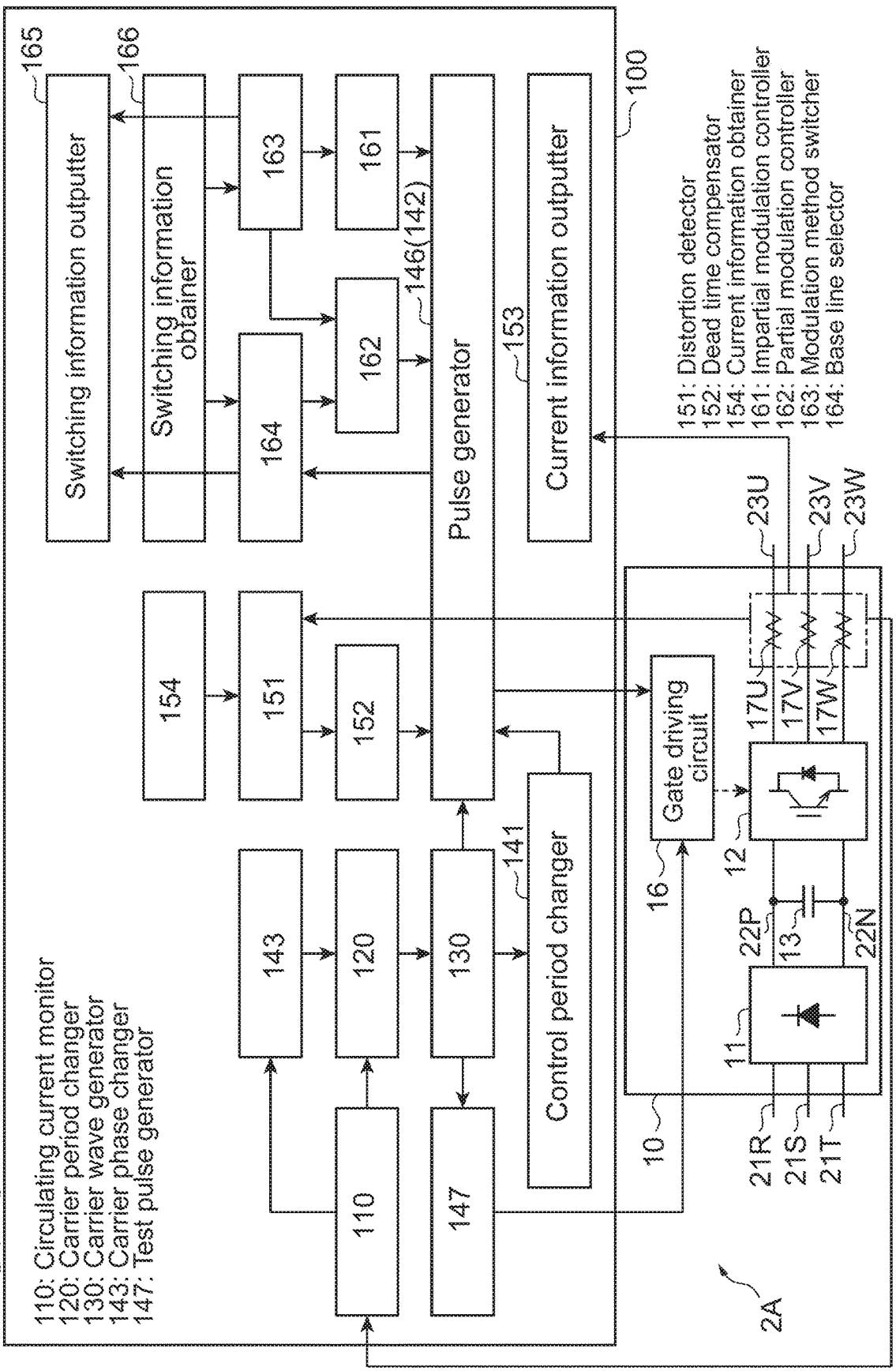
FIG. 13 is a block diagram illustrating a configuration of a power conversion apparatus according to a second embodiment.

A power conversion apparatus 2A uses a method different from the method used in the power conversion apparatus 2 according to the first embodiment in adjusting the phase of the carrier wave before the start of generation of driving power. As illustrated in FIG. 13, the control circuit 100 of the power conversion apparatus 2A does not include the phase information outputter 144 and the phase information obtainer 145. In the control circuit 100 of the power conversion apparatus 2A, the pulse generator 142 further includes a test pulse generator 147.

The test pulse generator 147 generates a pulse signal for outputting test power (hereinafter referred to as "test pulse signal"). The test pulse signal is smaller in width than the pulse signal for outputting driving power. The width of the test pulse signal is set at a value and a motion pattern that ensure that the load LD makes substantially no motion.

Based on a monitor value obtained by the circulating current monitor 110 while the inverter circuit 12 is generating test power, the carrier phase changer 143 of the power conversion apparatus 2A changes the phase of the carrier wave to decrease the phase difference (the monitor value will be hereinafter referred to as "test time monitor value"). Specifically, the carrier phase changer 143 requests the carrier period changer 120 to change the compare-match count value based on the test time monitor value. The carrier period changer 120 calculates a count correction value based on the test time monitor value, and adds the count correction value to the reference count value, thereby correcting the compare-match count value. This ensures that the period of one top of the carrier wave is changed, causing the phase of the next top to be adjusted, as described above in the context of the carrier period changer 120.

The carrier phase changer 143 may change the phase of the carrier wave to increase the test time monitor value when the test time monitor value is smaller than a value necessary for determining whether to change the phase of the carrier wave. Referring to the graph (e) illustrated in FIG. 4, the monitor value is zero when the phase difference is zero and when the phase difference is 180° (degrees). Therefore, when the phase difference is zero, it is impossible to determine whether to change the phase of the carrier wave based solely on the monitor value. In this case, it is possible to change the phase of the carrier wave on purpose to increase the test time monitor value. This makes clear the positivity or negativity of the test time monitor value, making possible the changing of the phase of the carrier wave to decrease the circulating current.

It is to be noted that when the test time monitor value is smaller than the value necessary for determining whether to change the phase of the carrier wave, the carrier phase changer 143 may shift the timing of current measurement from the top portion and the bottom portion of the carrier wave, obtain again the test time monitor value, and determine whether to change the phase based on a change in the test time monitor value. When the phase difference is zero, displacing the timing of current measurement does not cause any change to the test time monitor value. In contrast, when the phase difference is 180° (degrees), displacing the timing of current measurement causes the test time monitor value to change. In light of this, it is possible to determine whether to change the phase of the carrier wave based on a change in the test time monitor value based on a change in the measurement timing. This is clearly seen from the left end graph or the right end graph of the graphs (d) illustrated in FIG. 4, where the zero phase current is not zero at points other than point P1 and point P2.

2. 2 Method for Converting Power

Figure 14:
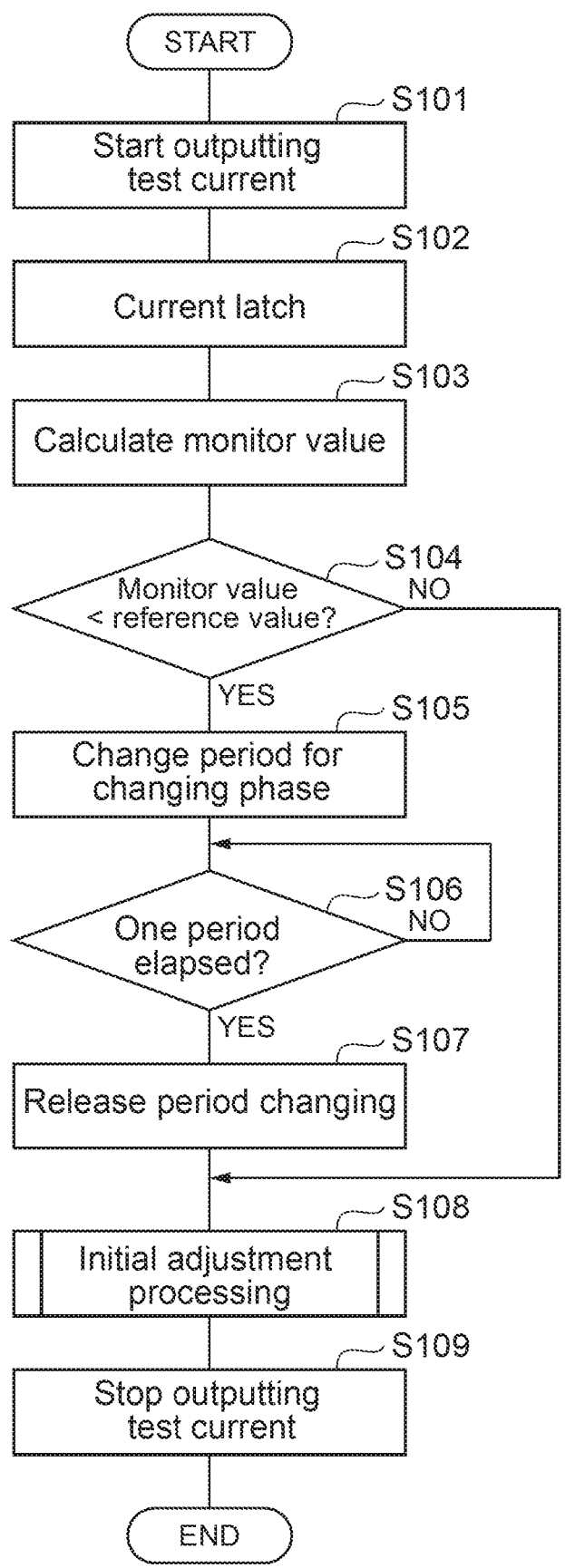
FIG. 14 is a flowchart of a modified procedure for phase adjustment of carrier wave performed before the start of driving power output.

FIG. 14 is a flowchart of an example procedure for phase adjustment performed by the power conversion apparatus 2A. As illustrated in FIG. 14, the control circuit 100 performs steps S101, S102, S103, and S104. At step S101, the test pulse generator 147 generates, synchronously with the carrier wave, a pulse signal for outputting test power, and starts outputting the pulse signal to the gate driving circuit 16. This causes the inverter circuit 12 to start outputting test power that is based on the width of the pulse signal. At step S102, the circulating current monitor 110 obtains and holds the top-portion U-phase current value, the top-portion V-phase current value, the top-portion W-phase current value, the bottom-portion U-phase current value, the bottom-portion V-phase current value, and the bottom-portion W-phase current value. At step S103, the circulating current monitor 110 calculates a test time monitor value by calculating the sum of the difference between the top-portion U-phase current value and the bottom-portion U-phase current value, the difference between the top-portion V-phase current value and the bottom-portion V-phase current value, and the difference between the top-portion W-phase current value and the bottom-portion W-phase current value. At step S104, the carrier phase changer 143 checks whether the test time monitor value is smaller than a predetermined reference value. The reference value is a value necessary for determining whether to change the phase of the carrier wave.

Upon determining at step S104 that the test time monitor value is smaller than the predetermined reference value, the control circuit 100 performs steps S105, S106, and S107. At step S105, the carrier phase changer 143 requests the carrier period changer 120 to add a predetermined count correction value for phase changing to the reference count value so as to change the compare-match count value. At step S106, the carrier phase changer 143 waits for the carrier period to elapse. At step S107, the carrier phase changer 143 requests the carrier period changer 120 to return the compare-match count value to the reference count value.

Next, the control circuit 100 performs steps S108 and S109. Upon determining at step S104 that the test time monitor value is not smaller than the predetermined reference value, the control circuit 100 skips steps S105 and S106,S107 and performs steps S108 and S109. At step S108, based on the test time monitor value, the carrier phase changer 143 changes the phase of the carrier wave to decrease the phase difference. Details of this processing will be described later. At step S109, the test pulse generator 147 stops outputting the pulse signal for outputting test power to the gate driving circuit 16. Thus, the procedure for phase adjustment is completed.

Figure 15:
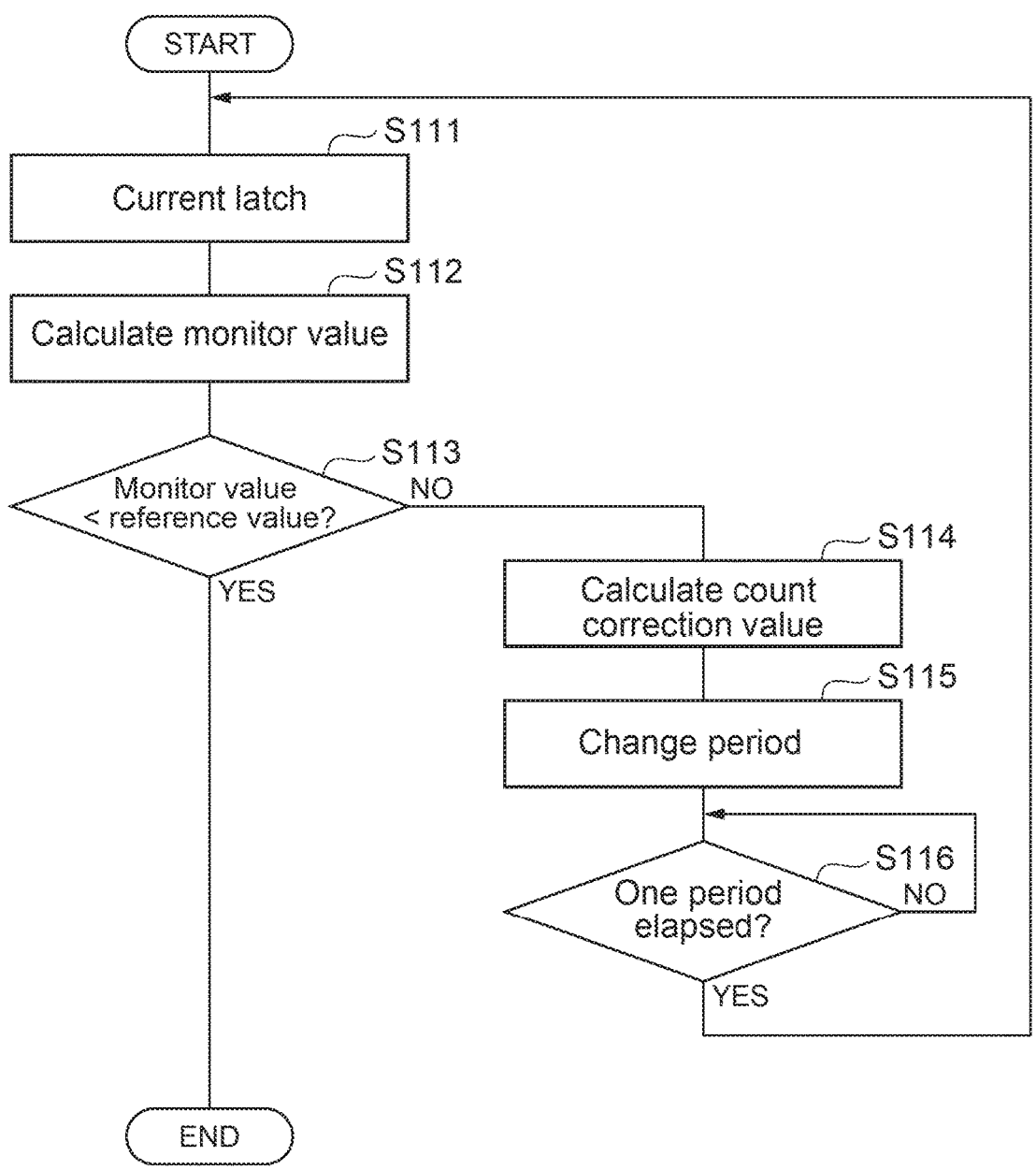
FIG. 15 is a flowchart of an example procedure for phase adjustment of carrier wave performed based on circulating current.

FIG. 15 is a flowchart of an example procedure for changing the phase of the carrier wave at step S108. As illustrated in FIG. 15, the control circuit 100 performs steps S111, S112, and S113. At step S111, the circulating current monitor 110 obtains and holds the top-portion U-phase current value, the top-portion V-phase current value, the top-portion W-phase current value, the bottom-portion U-phase current value, the bottom-portion V-phase current value, and the bottom-portion W-phase current value. At step S112, the circulating current monitor 110 calculates a test time monitor value by calculating the sum of the difference between the top-portion U-phase current value and the bottom-portion U-phase current value, the difference between the top-portion V-phase current value and the bottom-portion V-phase current value, and the difference between the top-portion W-phase current value and the bottom-portion W-phase current value. At step S113, the carrier phase changer 143 checks whether the test time monitor value is smaller than the predetermined reference value.

Upon determining at step S113 that the test time monitor value is smaller than the predetermined reference value, the control circuit 100 performs steps S114, S115, and S116. At step S114, the carrier phase changer 143 requests the carrier period changer 120 to calculate a count correction value based on the test time monitor value. At step S115, the carrier phase changer 143 requests the carrier period changer 120 to add the count correction value to the reference count value so as to change the compare-match count value. This causes the carrier period to be changed. At step S116, the carrier phase changer 143 waits for the carrier period to elapse. Then, the control circuit 100 returns the processing to step S111. In the processings that follow, the carrier period is repeatedly changed until the test time monitor value becomes smaller than the reference value. Upon determining at step S113 that the test time monitor value is smaller than the reference value, the control circuit 100 ends the processing. Thus, the procedure for changing the phase of the carrier wave is completed.

Figure 16:
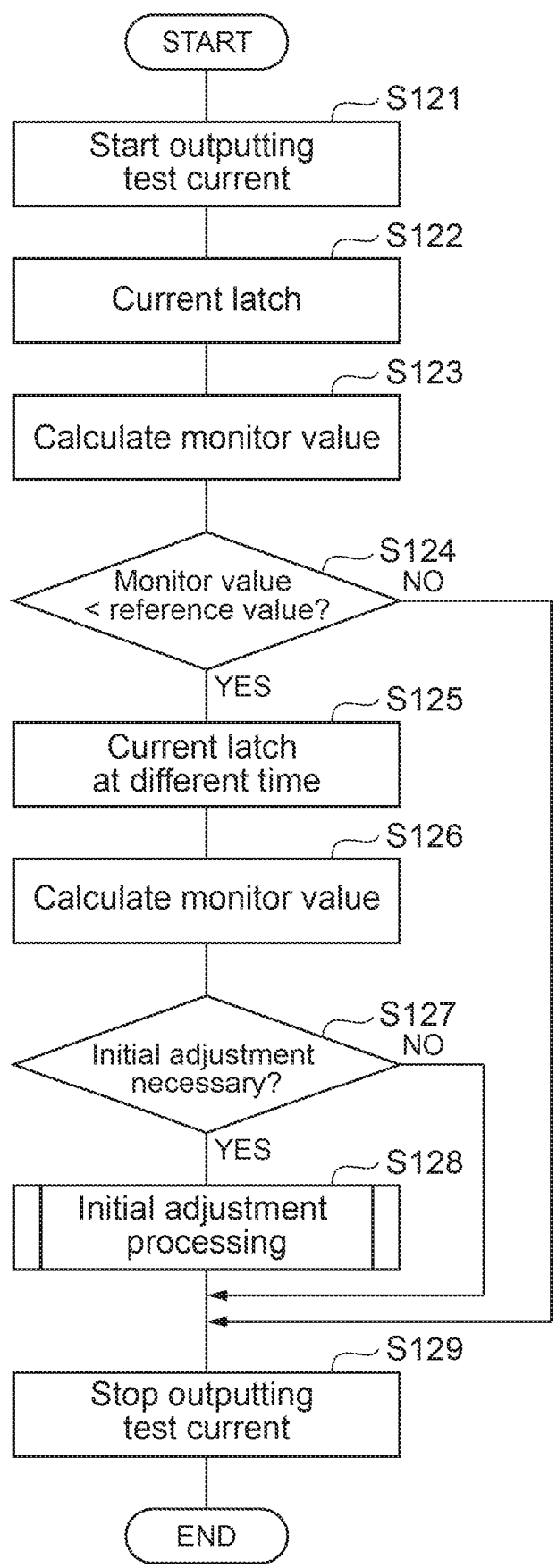
FIG. 16 is a flowchart of another modified procedure for phase adjustment of carrier wave performed before the start of driving power output.

FIG. 16 is a flowchart of a modified procedure for phase adjustment performed by the power conversion apparatus 2A. As illustrated in FIG. 16, the control circuit 100 performs steps S121, S122, S123, and S124. At steps S121 to 124, the control circuit 100 performs processings similar to the processings at steps S101 to 104.

Upon determining at step S124 that the test time monitor value is smaller than the predetermined reference value, the control circuit 100 performs steps S125 and S126. At step S125, the carrier phase changer 143 shifts the timing of current measurement from the top portion and the bottom portion of the carrier wave. The measurement timing shifted from the bottom portion will be hereinafter referred to as "first timing", and the measurement timing shifted from the top portion will be hereinafter referred to as "second timing". The carrier phase changer 143 requests the circulating current monitor 110 to obtain and hold a U-phase current value at the first timing, a V-phase current value at the first timing, a W-phase current value at the first timing, a U-phase current value at the second timing, a V-phase current value at the second timing, and a W-phase current value at the second timing. At step S126, the carrier phase changer 143 requests the circulating current monitor 110 to calculate a test time monitor value by calculating the sum of the difference between the U-phase current value at the first timing and the U-phase current value at the second timing, the difference between the V-phase current value at the first timing and the V-phase current value at the second timing, and the difference between the W-phase current value at the first timing and the W-phase current value at the second timing.

Next, the control circuit 100 performs step S127. At step S127, based on the test time monitor value calculated at step S126 and based on the test time monitor value calculated at step S123, the carrier phase changer 143 checks whether to change the phase of the carrier wave. Specifically, when the difference between the test time monitor value calculated at step S126 and the test time monitor value calculated at step S123 is larger than a predetermined threshold, the carrier phase changer 143 determines that it is necessary to change the phase of the carrier wave, while when the difference is smaller than the threshold, the carrier phase changer 143 determines that it is not necessary to change the phase of the carrier wave.

Upon determining at step S127 that it is necessary to change the phase of the carrier wave, the control circuit 100 performs step S128. At step S128, based on the test time monitor value, the carrier phase changer 143 changes the phase of the carrier wave to decrease the phase difference, similarly to step S108.

Next, the control circuit 100 performs step S129. Upon determining at step S127 that it is not necessary to change the phase of the carrier wave, the control circuit 100 skips step S128 and performs step S129. At step S129, the test pulse generator 147 stops outputting the pulse signal for outputting test power to the gate driving circuit 16, similarly to step S109. Thus, the procedure for phase adjustment is completed.

Advantageous Effects of the Embodiments

In one aspect of the disclosure, the power conversion apparatuses 2 and 2A respectively according to the first and second embodiments are each connectable in parallel to another power conversion apparatus 2 or 2A. Each of the power conversion apparatuses 2 and 2A includes the carrier wave generator 130, the pulse generator 142, the inverter circuit 12, the circulating current monitor 110, and the carrier period changer 120. The carrier wave generator 130 generates a carrier wave. The pulse generator 142 generates a pulse signal synchronized with the carrier wave. The inverter circuit 12 generates power that is based on the width of the pulse signal. The circulating current monitor 110 obtains a monitor value corresponding to a circulating current circulating between the each power conversion apparatus 2 or 2A and the other power conversion apparatus. Based on the monitor value obtained by the circulating current monitor 110 while the inverter circuit 12 is generating driving power, the carrier period changer 120 changes the period of the carrier wave generated by the carrier wave generator 130 to decrease the circulating current.

In this configuration, carrier waves are synchronized with each other based on circulating current. This ensures that real-time synchronization processing can be performed continuously without relying on communication performance. Also in the above configuration, the period of the carrier wave is changed for the purpose of carrier wave synchronization. This ensures that once synchronization is performed, the synchronization state is more likely to last. The above configuration, therefore, is effective for eliminating or minimizing circulating current caused by a carrier wave phase difference.

The power conversion apparatuses 2 and 2A each may further include the control period changer 141. Upon changing of the period of the carrier wave by the carrier period changer 120, the control period changer 141 changes the control period of the inverter circuit 12 to synchronize the control period with the period of the carrier wave. The pulse generator 142 may adjust the width of the pulse signal at a timing corresponding to the control period. Thus, the adjustment timing of the pulse width is synchronized with the timing of synchronization of the carrier wave. This improves the reliability with which circulating current is eliminated or minimized.

The circulating current monitor 110 may obtain, as the monitor value, the difference between a first current and a second current. The first current and the second current are generated by the inverter circuit 12 respectively at a first timing and a second timing set in one period of the carrier wave. This ensures that quick synchronization processing is performed with a simple operation.

The first timing and the second timing are phase-shifted from each other by half the period of the carrier wave, and the circulating current monitor 110 may obtain, as the monitor value, difference between the first current and the second current, which are respectively generated at the first timing and the second timing by the inverter circuit 12. This ensures that circulating current is detected with a higher level of sensitivity, improving the reliability with which circulating current is eliminated or minimized.

The circulating current monitor 110 may generate: a top current at a top timing corresponding to a top portion of the carrier wave; and a bottom current at a bottom timing corresponding to a bottom portion of the carrier wave. The circulating current monitor 110 may regard the difference between the top current and the bottom current as the difference between the first current and the second current, and may obtain the difference between the top current and the bottom current as the monitor value. This minimizes the influence of switching-caused noise, ensuring that circulating current is detected with a higher level of sensitivity and is eliminated or minimized more reliably.

The power conversion apparatuses 2 and 2A each may further include the carrier phase changer 143. Before the inverter circuit 12 starts generating the driving power, the carrier phase changer 143 changes the phase of the carrier wave to decrease the difference in the phases of the carrier waves between the each power conversion apparatus 2 or 2A and the other power conversion apparatus. This ensures that the carrier wave phase difference is minimized when the carrier period changer 120 starts adjusting the period of the carrier wave, making the synchronization of the carrier wave performed more quickly.

The carrier phase changer 143 may change the phase of the carrier wave to decrease the phase difference to or less than half the period of the carrier wave. This ensures that the synchronization of the carrier wave is performed more quickly.

The power conversion apparatus 2 may further include the phase information obtainer 145. The phase information obtainer 145 obtains phase information corresponding to the phase of the carrier wave generated in the another power conversion apparatus 2 or 2A. Based on the phase information obtained by the phase information obtainer 145, the carrier phase changer 143 may change the phase of the carrier wave to decrease the phase difference. This ensures that the carrier wave phase difference is decreased through communication with the another power conversion apparatus 2 or 2A, that is, by decreasing the phase difference with no power generated, the occurrence of circulating current is readily eliminated or minimized in the process of decreasing the phase difference.

The pulse generator 142 may include the driving pulse generator 146 and the test pulse generator 147. The driving pulse generator 146 generates a pulse signal for outputting driving power. The test pulse generator 147 generates a test power pulse signal for outputting test power, the test power pulse signal having a width smaller than a width of the driving power pulse signal. While the inverter circuit 12 is generating the test power, the carrier phase changer 143 may change the phase of the carrier wave based on the monitor value obtained by the circulating current monitor 110 to decrease the phase difference. This ensures that a smaller amount of power is generated when the carrier wave phase difference is decreased. This, in turn, eliminates or minimizes the occurrence of circulating current in the process of decreasing the phase difference.

When the monitor value is smaller than a value necessary for determining whether to change the phase of the carrier wave, the carrier phase changer 143 may change the phase of the carrier wave to increase the monitor value. This ensures that the circulating current and the phase difference are decreased more quickly. In some situations in which the phase difference is at a particular level, the difference between the first current and the second current, which are respectively generated at the first timing and the second timing by the power converter, is equivalent to a situation in which there is no phase difference. Even in this situation, the above configuration ensures that the presence and absence of phase difference is detected and the phase difference is decreased quickly.

Each of the power conversion apparatuses 2 and 2A may include the distortion detector 151 and the dead time compensator 152. Based on one current index value corresponding to the current output from the inverter circuit 12 and the current output from the inverter circuit 12 of the another power conversion apparatus 2 or 2A, the distortion detector 151 detects at least one of a current distortion and a voltage distortion caused by the dead time of the inverter circuit 12. The dead time compensator 152 corrects the width of the pulse signal based on the current distortion and/or the voltage distortion detected by the distortion detector 151. This prevents the circulating current from increasing when dead time compensation is performed.

In another aspect of the disclosure, the power conversion apparatuses 2 and 2A respectively according to the first and second embodiments are each connectable in parallel to another power conversion apparatus 2 or 2A. Each of the power conversion apparatuses 2 and 2A includes the inverter circuit 12, the base line selector 164, and the partial modulation controller 162. The inverter circuit 12 performs power conversion by changing the connection states of how the plurality of lines 22P and 22N, which are on the primary side, are connected to the plurality of lines 23U, 23V, and 23W, which are on the secondary side. The base line selector 164 selects, as a base line, any one line from the secondary-side lines 23U, 23V and 23W With the base line kept in connection with any one line of the primary-side lines 22P and 22N, the partial modulation controller 162 controls the inverter circuit 12 to change the connection states of how the other secondary-side lines 23U, 23V, and 23W are connected to the plurality of primary-side lines 22P and 22N. Based on the switching timing at which the base line selector of the another power conversion apparatus 2 or 2A selects, as the base line, one line from the lines 23U, 23V, and 23W, the base line selector 164 selects one line to be switched into the base line from the lines 23U, 23V, and 23W.

Switching losses may effectively be decreased by partial modulation control. When, however, partial modulation control is performed in parallel driving of power conversion apparatuses, a circulating current may possibly be caused to occur associated with a base line switching timing(s). In light of this, in the above configuration of the power conversion apparatuses 2 and 2A, the base switcher of the power conversion apparatus 2 or 2A performs base line switching synchronously with the base line switching performed by the base switcher of the another power conversion apparatus 2 or 2A. This enables partial modulation control to be employed while ensuring that the occurrence of circulating current is eliminated or minimized. Thus, the above configuration is effective for eliminating or minimizing switching losses.

The power conversion apparatuses 2 and 2A each may further include the switching information obtainer 166. The switching information obtainer 166 obtains information on a scheduled timing at which the base line selector 164 of the another power conversion apparatus 2 or 2A selects one line to be switched into the base line from the lines 23U, 23V, and 23W. Upon elapse of time to reach the scheduled timing obtained by the switch information obtainer, the base line selector 164 may select one line to be switched into the base line from the lines 23U, 23V, and 23W. Thus, the scheduled timing is shared before the base line switching, resulting in more reliable synchronization.

The power conversion apparatuses 2 and 2A each may further include the pulse generator 142, the circulating current monitor 110, and the carrier period changer 120. The pulse generator 142 generates, synchronously with the carrier wave, a pulse signal for causing the inverter circuit 12 to change the connection states of how the plurality of lines 22P and 22N, which are on the primary side, are connected to the plurality of lines 23U, 23V, and 23W, which are on the secondary side. The circulating current monitor 110 obtains a monitor value corresponding to a circulating current circulating between the each power conversion apparatus 2 or 2A and the other power conversion apparatus. Based on the monitor value obtained by the circulating current monitor 110, the carrier period changer 120 changes at least one of the phase and the period of the carrier wave to decrease the circulating current. This configuration improves the reliability with which circulating current is eliminated or minimized.

In the above-described embodiments, the carrier period changer 120, which changes the period of the carrier wave, is described as an example carrier wave changer. This configuration, however, is not intended in a limiting sense. The carrier wave changer may change the phase of the carrier wave.

The pulse generator 142 may adjust the width of the pulse signal at a timing corresponding to a control period synchronized with the carrier wave, and the base line selector 164 may, at a timing corresponding to the control period, select one line to be switched into the base line. This configuration ensures that the adjustment timing of the pulse width is synchronized along with the synchronization of the carrier wave. The above configuration also ensures that the switching timing of the base line is synchronized more reliably along with the synchronization of the carrier wave. This improves the reliability with which circulating current is eliminated or minimized.

The power conversion apparatuses 2 and 2A each may further include the impartial modulation controller 161 and the modulation method switcher 163. The impartial modulation controller 161 controls the inverter circuit 12 to change the connection states of how all the secondary-side lines 23U, 23V, and 23W are connected to the plurality of primary-side lines 22P and 22N. The modulation method switcher 163 switches the method of modulation performed by the inverter circuit 12 between modulation performed by the partial modulation controller 162 and modulation performed by the impartial modulation controller 161. The modulation method switcher 163 may switch the method of modulation based on the timing at which the modulation method switcher 163 of the another power conversion apparatus 2 or 2A switches the method of modulation. This eliminates or minimizes the occurrence of circulating current, including a circulating current caused by a discrepancy in the switching timing of modulation method.

The power conversion system 1 may include at least two power conversion apparatuses 2 and 2A; one power conversion apparatus 2 or 2A and another power conversion apparatus 2 or 2A. The base line selector 164 of the another power conversion apparatus 2 or 2A may, based on the phase of a voltage command value on the secondary side, select one line to be switched into the base line. This ensures that both in the power conversion apparatus 2 or 2A and the another power conversion apparatus 2 or 2A, the base line is switched at an approximate timing based on a change in voltage on the secondary side.

In still another aspect of the disclosure, the power conversion apparatuses 2 and 2A respectively according to the first and second embodiments each include the carrier wave generator 130, the pulse generator 142, the inverter circuit 12, the distortion detector 151, and the dead time compensator 152. The carrier wave generator 130 generates a carrier wave. The pulse generator 142 generates a pulse signal synchronized with the carrier wave. The inverter circuit 12 generates power that is based on the width of the pulse signal. Based on one current index value corresponding to the current output from the inverter circuit 12 of the power conversion apparatus 2 or 2A and the current output from the inverter circuit 12 of the another power conversion apparatus 2 or 2A, the distortion detector 151 detects at least one of a current distortion and a voltage distortion caused by the dead time of the inverter circuit 12. The dead time compensator 152 corrects the width of the pulse signal based on the current distortion and/or the voltage distortion detected by the distortion detector 151.

A circulating current may occur between this apparatus and the other apparatus. If a circulating current occurs, a small difference occurs between the current output from this apparatus and the current output from the other apparatus. Under the circumstances, if dead time compensation is performed independently in each individual apparatus based on a current detected in each individual apparatus, a difference in the width of the pulse signal occurs due to a difference in compensation level. As a result, the circulating current may increase. If the circulating current increases, the difference in the level of dead time compensation further increases. Thus, a negative synergetic effect occurs to increase the circulating current. In light of this, the above configuration ensures that the inverter circuits 12 of this and the other apparatuses perform dead time compensation based on one current index value. This eliminates or minimizes an increase in circulating current caused by a difference in the level of compensation, and eliminates or minimizes the above-described negative synergetic effect.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A power conversion apparatus connectable in parallel to a second power conversion apparatus, comprising:
   circuitry configured to
      generate a carrier wave,
      generate a pulse signal synchronized with the carrier wave,
      generate power that is based on a width of the pulse signal,
      obtain a monitor value corresponding to a circulating current circulating between the power conversion apparatus and the second power conversion apparatus without flowing to a load, and
      based on the monitor value obtained while the power conversion circuitry is generating driving power, change a period of the carrier wave to decrease the circulating current,
      wherein the circuitry is further configured to, upon changing of the period of the carrier wave, change a control period of the circuitry to synchronize the control period with the period of the carrier wave, and adjust the width of the pulse signal at a timing corresponding to the control period.

2. The power conversion apparatus according to claim 1, wherein the circuitry is further configured to generate a first current at a first timing set in one period of the carrier wave, and a second current at a second timing set in the one period, and the circuitry is further configured to obtain, as the monitor value, a difference between the first current and the second current.

3. The power conversion apparatus according to claim 2, wherein the first timing and the second timing are phase-shifted from each other by half a period of the carrier wave, and the circuitry is further configured to obtain, as the monitor value, a difference between the first current and the second current.

4. The power conversion apparatus according to claim 3, wherein the circuitry is further configured to generate a top current at a top timing corresponding to a top portion of the carrier wave, and a bottom current at a bottom timing corresponding to a bottom portion of the carrier wave, and the circuitry is further configured to regard a difference between the top current and the bottom current as a difference between the first current and the second current, and obtain the difference between the top current and the bottom current as the monitor value.

5. The power conversion apparatus according to claim 1, wherein the circuitry is further configured to, before the circuitry starts generating the driving power, change a phase of the carrier wave to decrease a phase difference between the phase of the carrier wave generated in the power conversion apparatus and a phase of a second carrier wave generated in the second power conversion apparatus.

6. The power conversion apparatus according to claim 5, wherein the circuitry is further configured to change the phase of the carrier wave to decrease the phase difference to less than half a period of the carrier wave.

7. The power conversion apparatus according to claim 5, wherein the circuitry is further configured to obtain phase information corresponding to a phase of the second carrier wave generated in the second power conversion apparatus, and the circuitry is further configured to, based on the phase information, change the phase of the carrier wave generated in the power conversion apparatus to decrease the phase difference.

8. The power conversion apparatus according to claim 6, wherein the circuitry is further configured to generate the pulse signal as a driving power pulse signal for outputting the driving power, generate a test power pulse signal for outputting test power, the test power pulse signal having a width smaller than a width of the driving power pulse signal, and while the circuitry is generating the test power, change the phase of the carrier wave based on the monitor value to decrease the phase difference.

9. The power conversion apparatus according to claim 8, wherein when the monitor value is smaller than a value necessary for determining whether to change the phase of the carrier wave, the circuitry is further configured to change the phase of the carrier wave to increase the monitor value.

10. The power conversion apparatus according to claim 1, wherein the circuitry is further configured to, based on one current index value corresponding to a current output from the circuitry and a second current output from second circuitry of the second power conversion apparatus, detect at least one of a current distortion and a voltage distortion that are caused by a dead time of the circuitry, and correct the width of the pulse signal based on at least one of the current distortion and the voltage distortion detected by the circuitry.

11. The power conversion apparatus according to claim 1, wherein the monitor value corresponding to a difference between a first current and a second current, which are respectively generated at a first timing and a second timing, the first timing and the second timing being phase-shifted from each other.

12. A power conversion system, comprising:
   a first power conversion apparatus; and
   a second power conversion apparatus,
      wherein the first and second power conversion apparatuses are connectable in parallel to each other, and at least one of the first power conversion apparatus and the second power conversion apparatus includes circuitry configured to generate a carrier wave, generate a pulse signal synchronized with the carrier wave, generate power that is based on a width of the pulse signal, obtain a monitor value corresponding to a circulating current circulating between the first power conversion apparatus and the second power conversion apparatus without flowing to a load, and based on the monitor value obtained while the circuit is generating driving power, change a period of the carrier wave to decrease the circulating current.

13. The power conversion system according to claim 12, wherein the circuitry is further configured to, before the circuitry starts generating the driving power, change a phase of the carrier wave to decrease a phase difference between the phase of the carrier wave generated in the first power conversion apparatus and a phase of a second carrier wave generated in the second power conversion apparatus.

14. The power conversion system according to claim 13, wherein the circuitry is further configured to change the phase of the carrier wave to decrease a phase difference to less than half the period of the carrier wave.

15. The power conversion system according to claim 13, wherein the circuitry is further configured to obtain phase information corresponding to the phase of the second carrier wave generated in the second power conversion apparatus or the phase of the carrier wave generated in the first power conversion apparatus, and based on the phase information, change the phase of the carrier wave generated in the first power conversion apparatus or the phase of the second carrier wave generated in the second power conversion apparatus to decrease the phase difference.

16. The power conversion system according to claim 13, wherein the circuitry is further configured to generate, as the pulse signal, a driving power pulse signal for outputting the driving power, generate a test power pulse signal for outputting test power, the test power pulse signal having a width smaller than a width of the driving power pulse signal, and while the circuitry is generating the test power, change the phase of the carrier wave based on the monitor value to decrease the phase difference.

17. The power conversion system according to claim 16, wherein based on a relationship between a change in the phase of the carrier wave observed while the circuitry is generating the test power and a change in the monitor value obtained by the circuitry, the circuitry is further configured to determine a direction in which the phase of the carrier wave is changed to decrease the phase difference.

18. A method for converting power in a power conversion apparatus connectable in parallel to a second power conversion apparatus, comprising:

generating a carrier wave;

generating a pulse signal synchronized with the carrier wave;

causing a power converter to generate power that is based on a width of the pulse signal;

obtaining a monitor value corresponding to a circulating current circulating between the power conversion apparatus and the second power conversion apparatus without flowing to a load;

based on the monitor value obtained while the power converter is generating driving power, changing a period of the carrier wave to decrease the circulating current;

based on one current index value corresponding to a current output from the power converter and second current output from a second power converter of the second power conversion apparatus, detecting at least one of a current distortion and a voltage distortion that are caused by a dead time of the power converter; and correcting the width of the pulse signal based on at least one of the current distortion and the voltage distortion that have been detected.

* * * * *